United States Patent
Beeri et al.

(10) Patent No.: US 11,291,172 B2
(45) Date of Patent: Apr. 5, 2022

(54) METHODS AND SYSTEMS FOR IRRIGATION GUIDANCE

(71) Applicant: MANNA IRRIGATION LTD., Gvat (IL)

(72) Inventors: Ofer Beeri, Kibbutz Yagur (IL); Shay Mey-Tal, Herzliya (IL)

(73) Assignee: Manna Irrigation Ltd., Gvat (IL)

( * ) Notice: Subject to any disclaimer, the term of this patent is extended or adjusted under 35 U.S.C. 154(b) by 177 days.

(21) Appl. No.: 16/628,256

(22) PCT Filed: Jul. 1, 2018

(86) PCT No.: PCT/IL2018/050710
§ 371 (c)(1),
(2) Date: Jan. 2, 2020

(87) PCT Pub. No.: WO2019/008570
PCT Pub. Date: Jan. 10, 2019

(65) Prior Publication Data
US 2020/0214231 A1    Jul. 9, 2020

(30) Foreign Application Priority Data
Jul. 2, 2017    (IL) .......................................... 253260

(51) Int. Cl.
*A01G 25/16*    (2006.01)
*G05B 19/042*    (2006.01)
(Continued)

(52) U.S. Cl.
CPC ......... *A01G 25/165* (2013.01); *G05B 19/042* (2013.01); *B64C 39/02* (2013.01);
(Continued)

(58) Field of Classification Search
CPC .. A01G 25/165; A01G 25/167; G05B 19/042; G05B 2219/2625;
(Continued)

(56) References Cited

U.S. PATENT DOCUMENTS 7,068,816 B1    6/2006    Knoblauch
8,135,178 B2    3/2012    Hendrickson
(Continued)

FOREIGN PATENT DOCUMENTS

CN    102402185 A    4/2012
EP     3179319 A1    6/2017
(Continued)

OTHER PUBLICATIONS

Akdim et al., (2014) Monitoring of irrigation schemes by remote sensing: Phenology versus retrieval of biophysical variables. Remote Sensing 6(6): 5815-5851.
(Continued)

*Primary Examiner* — Chad G Erdman
(74) *Attorney, Agent, or Firm* — Rodney J. Fuller; Booth Udall Fuller, PLC

(57) ABSTRACT

The present invention provides systems and methods in the field of precision agriculture, particularly to systems and methods for precision irrigation that is based, among other factors, upon actual and forecasted water needs of a crop.

23 Claims, 13 Drawing Sheets

(51) Int. Cl.
*B64G 1/10* (2006.01)
*B64C 39/02* (2006.01)
*G06Q 50/02* (2012.01)

(52) U.S. Cl.
CPC ...... *B64C 2201/123* (2013.01); *B64G 1/1021* (2013.01); *G05B 2219/2625* (2013.01)

(58) Field of Classification Search
CPC . B64C 2201/123; B64C 39/02; B64G 1/1021; G06Q 50/02; Y02A 40/10; Y02A 40/22
See application file for complete search history.

(56) References Cited

U.S. PATENT DOCUMENTS

| | | | |
|---|---|---|---|
| 8,671,006 B2 | 3/2014 | Zyskowski | |
| 8,816,262 B2 | 8/2014 | Holland | |
| 8,924,031 B1 | 12/2014 | Evett | |
| 9,113,590 B2 | 8/2015 | Johnson | |
| 9,131,642 B2 | 9/2015 | Groeneveld | |
| 2017/0038749 A1* | 2/2017 | Mewes | G05B 19/042 |

FOREIGN PATENT DOCUMENTS

| | | | |
|---|---|---|---|
| WO | 2017077543 A1 | 5/2017 | |
| WO | 2018173045 A1 | 9/2018 | |
| WO | 2019198072 A1 | 10/2019 | |

OTHER PUBLICATIONS

Allen and Pereira (2009) Estimating crop coefficients from fraction of ground cover and height. Irrig Sci 28: 17-34.
Anderson et al., (2004) Upscaling ground observations of vegetation water content, canopy height, and leaf area index during SMEX02 using aircraft and Landsat imagery. Remote Sensing of Environment 92(4): 447-464.
Beeri et al., (2017) Mapping Crop Coefficient using hi-frequency satellite imaging for weekly Irrigation Scheduling. ECPA 2017—11th European Conference on Precision Agriculture, Jul. 16-20, 2017; Edinburgh, United Kingdom; 1 page.
Cohen et al., (2003) Comparisons of land cover and LAI estimates derived from EIM+ and MODIS for four sites in North America: a quality assessment of 2000/2001 provisional MODIS products. Remote Sensing of Environment 88 (3): 233-255.
Conceição et al., (2017) Three years of monitoring evapotranspiration components and crop and stress coefficients in a deficit irrigated intensive olive orchard. Agricultural Water Management 191:138-152.
Glenn et al., (2008) Relationship Between Remotely-sensed Vegetation Indices, Canopy Attributes and Plant Physiological Processes: What Vegetation Indices Can and Cannot Tell US About the Landscape. Sensors 8(4): 2136-2160.
Hunt et al., (1987) Measurement of Leaf Relative Water Content by Infrared Reflectance. Remote sensing of environment 22: 429-435.
Jackson et al., (1981) Canopy temperature as a crop water stress indicator. Water Resources Research 17(4): 1133-1138.
Jackson et al., (2004) Vegetation water content mapping using Landsat data derived normalized difference water index for corn and soybeans. Remote Sensing of Environment 92(4): 475-482.
Johnson and Trout (2012) Satellite NDVI Assisted Monitoring of Vegetable Crop Evapotranspiration in California's San Joaquin Valley. Remote Sens 4(2): 439-455.
Kamble et al., (2013) Estimating crop coefficients using remote sensing-based vegetation index. Remote Sensing 5(4): 1588-1602.
Kopyt and Tsadok, "Everyday monitoring of stem water potential for decision making in irrigation of grapevines". Grapegrower & Winemaker Jul. 2015, pp. 44-48.
Kullberg et al., (2017) Evaluation of thermal remote sensing indices to estimate crop evapotranspiration coefficients. Agricultural Water Management 179: 64-73.
Montgomery et al., (2015) IrriSAT—weather based scheduling and benchmarking technology. 17th Australian Agronomy Conference, Sep. 20-24, 2015 Wrest Point Convention Centre, Hobart, Tasmania, Australia; pp. 1015-1018.
Moran (1994) Irrigation management in Arizona using satellites and airplanes. Irrigation Science 15: 35-44.
Moran et al., (1994) Estimating crop water deficit using the relation between surface-air temperature and spectral vegetation index. Remote Sensing of Environment 49(3): 246-263.
Moran et al., (1997) Opportunities and limitations for image-based remote sensing in precision crop management. Remote Sensing of Environment 61(3): 319-346.
Moran et al., (2001) A refined empirical line approach for reflectance factor retrieval from Landsat-5 TM and Landsat-7 ETM+. Remote Sensing of Environment 78: 71-82.
Padro et al., (2017) Radiometric Correction of Simultaneously Acquired Landsat-7/Landsat-8 and Sentinel-2A Imagery Using Pseudoinvariant Areas (PIA): Contributing to the LandsatTime Series Legacy. Remote Sens. 9(12): 1319; 26 pages.
Van Beek et al., (2013) Stem Water Potential Monitoring in Pear Orchards through WorldView-2 Multispectral Imagery. Remote Sensing 5(12): 6647-6666.
Vanino et al., (2015) Estimation of evapotranspiration and crop coefficients of tendone vineyards using multi-sensor remote sensing data in a mediterranean environment. Remote Sensing 7(11): 14708-14730.
Wang and Qu (2007) NMDI: A normalized multi-band drought index for monitoring soil and vegetation moisture with satellite remote sensing. Geophysical Research Letters 34(20): L20405; 5 pages.
Rouse J W et al., 1974. Monitoring vegetation systems in the Great Plains with ERTS. In: Fraden S C., Marcanti E P., and Becker M A. (eds.), Third ERTS-1 Symposium, Dec. 10-14, 1973, NASA SP-351, Washington D.C. NASA, pp. 309-317.

* cited by examiner

METHODS AND SYSTEMS FOR IRRIGATION GUIDANCE

CROSS-REFERENCE TO RELATED APPLICATIONS

This application is the U.S. National Stage of International Application No. PCT/IL2018/050710, filed on Jul. 1, 2018, which claims the benefit of and priority to Israeli Application No. 253260, filed on Jul. 2, 2017, the contents of each of which are hereby incorporated by reference in their entireties.

FIELD OF THE INVENTION

The present invention relates to the field of precision agriculture, particularly to systems and methods for precision irrigation that is based, among other factors, upon actual and forecasted water needs of a crop.

BACKGROUND OF THE INVENTION

Adequate water supply is a key factor in the production of high yield and high quality agricultural crops. Irrigation is a common practice in agriculture, particularly in areas that are marginal or unsuitable for crop production when irrigation is not provided. The challenge of modern irrigated agriculture is to provide high crop yield and quality while conserving water and energy—a challenge that requires highly efficient irrigation. Efficient irrigation requires optimization of the irrigation times and corresponding amounts of water for a crop species at the environmental conditions in which the crop is grown.

To grow and produce mass and yield, plants must take up water and minerals from the soil through the roots and $CO_2$ from the atmosphere through the leaves as to allow photosynthesis. $CO_2$ is taken by the leaves through small pores called stomata, which are part of highly structured complexes that can control the opening of the pores in response to relative humidity, carbon dioxide concentration within the leaves, light-intensity and temperature. The need to keep the stomata open, to allow photosynthesis, results in a constant water movement from the soil through the roots to the upper parts of the plant and out into the atmosphere—a process that is called transpiration. Transpiration is also necessary to keep a physiological temperature within the plant cells. The most accurate measure of the water status within the plant cells is denoted by the plant water potential $\Psi_w$ in pressure units. To allow water uptake and transpiration by the plant, its water potential should be more negative (having a higher absolute value) than the soil water potential, the latter depending on the soil moisture content and the soil type.

Soil moisture at a plant root area at a given time point is the net of the amount of water applied (either by irrigation or natural precipitations) minus the direct evaporation of water from the soil surface and the transpiration rate, together called evapotranspiration. The purpose of irrigation is thus to keep the soil moisture at a desired water potential value that enables water uptake by the plant and transpiration at a rate leading to optimal growth, typically depending on the crop species.

Measuring the plant water potential would provide the most effective data to determine irrigation needs. As of today, the plant water potential can be accurately measured using pressure chambers. Field trials provide for correlation of the plant water potential and optimal growth, by which irrigation models are calculated. Irrigation can thus be set by measuring the plant water potential in the field using pressure chamber and using an irrigation model corresponding to the crop plant species. However, the high cost and complexity of operation of these chambers limit their use by farmers. An alternative option to estimate the plant water potential is to use soil moisture sensors or plant sensors located within the crop field. While providing reliable measurements, the sensors represent only a small part of the field and thus the measurements may be interpreted erroneously. In addition, the sensors should be physically placed in the field and are prone to damages. Nevertheless, such sensors are currently commonly used by farmers. Recently, the field of remote sensing of soil moisture is under extensive research and development, and means and methods, specifically using active and passive microwave domains, as well as thermal infrared information are developed.

An alternative option to determine the plant water status and the irrigation needs is by using equations for estimating the evapotranspiration of water. Many such equations and methods exist. One of the most commonly used equations in modern irrigation scheduling is the Penman-Monteith equation, which is used as a standard by the United Nations Food and Agriculture Organization (FAO). The Penman-Monteith equation correlates plant properties to weather conditions (including temperature, humidity, wind, and radiation) to the mass or volume of water lost to evapotranspiration. Since the plant properties vary from one type of plant to the next, and can also vary throughout the growth cycle, it is common to calculate actual evapotranspiration of a crop (ETa) using formulae based on the evapotranspiration of a reference crop (such as alfalfa or grass) multiplied by modulating coefficients:

$$ETa = ET0 * Kc * Ks$$

wherein ET0 is the evapotranspiration rate of the reference crop (e.g. obtained from a weather station or local weather service, also referred to as $ET_r$), Kc is a crop coefficient that varies by crop and growth stage, and Ks is a water stress coefficient that reflects the reduction in the rate of evapotranspiration mainly as soils become dry. At any given point in a crop's growth cycle, the Kc value for a non-stressed crop is simply the ratio of its actual evapotranspiration rate relative to that of the reference crop. Values of Kc may be near 0 for seedlings and usually range upward to values of 1.6 for some crops at peak vegetative stage with canopies fully covering the ground. Appropriate Kc coefficients for most common crops, varying throughout the growth cycle, have been measured and published by various organizations. The water stress coefficient, Ks, is set to a value of 1.0 for a crop that is not experiencing any moisture stress, but decreases according to the reduction of evapotranspiration of a crop experiencing increasing moisture stress (or other stressors such as disease, nutrient deficiency, etc.).

However, such evapotranspiration equations have several limitations and thus do not meet the requirements of precision irrigation. There is an ongoing search for more sophisticated approaches for modeling the complex system soil-water-plant-atmosphere. Modern land surface models, developed largely in response to the need for understanding the large-scale interactions between the soils, plants and atmosphere as important factors driving weather and climate, offer a potential starting point for a next generation of irrigation scheduling models.

Determining plant biomass per unit area using remote sensing can be traced back to the beginnings of satellite remote sensing with the satellite Landsat in the 1970s (Rouse J W et al., 1974. Monitoring vegetation systems in the Great Plains with ERTS. In: Fraden S C., Marcanti E P., and Becker M A. (eds.), Third ERTS-1 Symposium, 10-14 Dec. 1973, NASA SP-351, Washington D.C. NASA, pp. 309-317) and is based on the fact that growing vegetation has a low red reflectance due to absorption by chlorophyll and other plant pigments. The basic use of remote sensing has since been developed and is currently used for vegetation growth mapping including, for example, measuring percentage of vegetation cover (Johnson L F and Trout T J. 2012. Remote Sensing 4:439-455), height (Anderson et al., 2004. Remote Sensing of Environment, 92:447-464); and leaf area (Cohen et at, 2003, Remote Sensing of Environment, 88:233-255; Glenn et al., 2008. Sensors, 8:2136-2160). These measures can be used for determining irrigation curves for certain crops based on data obtained from field trials.

Remote sensing has been further developed for use in evaluating plant water status. For example, Hunt et al. measured leaf relative water content by infrared reflectance (Hunt et al., 1987. Remote Sensing of Environment, 22:429-435). Satellite imaging has been effectively used for mapping water stress in pears (Van Beek et al., 2013. Remote Sensing, 5(12):6647-6666) and water percentage in maize and soybean (Jackson et al., 2004. Remote Sensing of Environment, 92:475-482) and in pasture vegetation (Wang and Qu, 2007. Geophysical Research Letters, 34:L20405).

Another form of remote sensing data widely used for determining vegetation indices and irrigation models is thermal data (see, for example, Jackson et al., 1981, Water Resources Research, 17(4):1133-1138; Moran M S et al., 1994. Irrigation Science, 15:35-44; Kullberg et al., 2017. Agricultural Water Management, 179:64-73). However, satellite thermal data currently can be obtained only for wide areas significantly exceeding the area of an average agricultural field for which irrigation schedule is to be determined.

U.S. Pat. No. 9,131,642 discloses a system and method to use remote sensing to estimate crop water use that is forecasted and updated as weather and new satellite data become available. From these data the system and method uses a water accounting algorithm to prescribe irrigation differentially for regions of a field or for the entire field as an average. Irrigation prescription is delivered remotely through Internet technology.

U.S. Application Publication No. 2017/0038749 discloses an irrigation modelling framework in precision agriculture utilizing a combination of weather data, crop data, and other agricultural inputs to create customized agronomic models for diagnosing and predicting a moisture state in a field, and a corresponding need for, and timing of, irrigation activities. Specific combinations of various agricultural inputs can be applied, together with weather information to identify or adjust water-related characteristics of crops and soils, to model optimal irrigation activities and provide advisories, recommendations, and scheduling guidance for targeted application of artificial precipitation to address specific moisture conditions in a soil system of a field.

There is a great demand for methods and systems for optimizing irrigation at least on a weekly basis, in a variable spatial resolution of irrigation blocks, which are affordable in price.

SUMMARY OF THE INVENTION

The present invention provides systems and methods for precise management of agricultural irrigation in an effective area of crop fields. The systems and methods are based on a combined application of data obtained during the growing season (presently obtained or recently obtained data) and of reference data (e.g. historical data from growing seasons before the present one). Practicing the invention combines data of plant water potential, weather conditions, particularly evapotranspiration, crop-specific information and the most recent irrigation or rain.

Achieving high quantity and quality of yield requires keeping the plant water potential at a value which is specific for plant species and growth development stages. The need to reduce agricultural water use while maintaining high yields has led to the development of irrigation strategies where over a growing season the plants are kept not at a full saturation but at a mild to moderate water stress. Irrigation is required once the water potential drops below a threshold value, under which a reduction in crop productivity is observed. This threshold value is sometime referred to as the allowable water stress of the plant. The methods and systems of the present invention answer the need to maintain the desired water status across pre-defined area of a crop field.

The present invention is based in part on a novel method for determining values of the water stress coefficient (Ks) throughout a growing season and further on the integration of the obtained values to generate and optionally execute an irrigation plan. The Ks values ($Ks^{cur}$ and/or $Ks^{ex}$ are calculated de novo for each time point during the growing season providing precise measurement of the plants water demand at that time.

More particularly, the present invention utilizes measurements of crop water potential (meaning the average water potential of a crop in an area of a field, typically n a field subplot), and of evapotranspiration in a vicinity of the crop field together with vegetation moisture stress reference indices (VMSRIs) within a computing environment, to provide an irrigation plan. The VMSRI values are either built upon historical data or upon data obtained during the actual crop growth. The current plant water potential can be obtained directly (i.e. in situ), by remote-sensing (e.g. derived from satellite imagery of the plant canopy or of soil moisture parameters), or a combination thereof.

The VMSRIs include characteristic non-stress, maximum stress and recommended stress (also referred to as the irrigation strategy) reference indices of a crop. The Ks values obtained by the methods of the invention, preferably based on current measurements of the crop water potential ($Ks^{cur}$) are then used to calculate the actual evapotranspiration (ETa) of the crop, which reflects the actual status of the water needs at the time of measurements, and can be used to forecast the required amount of water in the next irrigation.

According to certain embodiments, computing the crop coefficient Kc and the crop water stress Ks according to the teachings of the present invention relies on remote sensing data.

According to a first aspect, the present invention provides a method for managing agricultural irrigation of a crop in an area of a field or a subplot thereof during a growing period, the method comprising:

receiving data indicative of an irrigation recommendation function of the crop during a growing period (IR(t)), data indicative of a current crop water potential at a time $t_S$ within the growing period, data indicative of an evapotranspiration (ET0) at $t_S$, and optionally data indicative of a last irrigation time and data indicative of a crop coefficient Kc;

computing a current water stress coefficient $Ks^{cur}(t_S)$;

computing an actual evapotranspiration (ETa) at $t_S$ (ETa $(t_S)$) of said crop by taking a product of $Ks^{cur}(t_S)$ and a corresponding non-stress crop evapotranspiration (ETc) at $t_S$ (ETc($t_S$)), wherein ETc($t_S$)=ET0($t_S$)*Kc($t_S$); and if ETa($t_S$)≥IR($t_S$), setting an optimal irrigation time ($t_{ow}$) by extrapolating a line L passing through or near a first point $P_1$ and a second point $P_2$, $P_1$ defined by first coordinates ($t_L$, ETc($t_L$)) comprising a last irrigation time $t_L$, which is earlier than $t_S$, and ETc at $t_L$, and $P_2$ defined by second coordinates ($t_S$, ETa($t_S$));

obtaining a third point $P_3$, whereat the line L intersects, or is tangent to, a curve defined by IR(t); wherein $t_{opt}$ is equal to the day of the time coordinate of $P_3$; and setting the forecast irrigation amount (FIA) by computing a value v indicative of an integral of IR(t), between $t_{L+1}$ and $t_{opt}$, wherein $t_{L+1}$ equals $t_L$ plus one day, wherein the FIA is equal to v.

According to further embodiments the method is carried out within a computing environment comprising at least one computer processor and at least one computer-readable storage medium operably coupled to the computer processor and having program instructions stored therein and data specifying a crop type, a boundary of the field area, a start of the growing period, and optionally values of a crop coefficient Kc for the growing period, the computer processor being operable to execute the program instructions to generate an irrigation plan comprising the optimal irrigation time ($t_{opt}$) for a next irrigation and the forecast irrigation amount (FIA) at $t_{opt}$.

According to some embodiments, the method further comprises generating, as output data, the optimal irrigation time ($t_{opt}$) and the forecast irrigation amount (FIA).

According to some embodiments, if ETa($t_S$)<IR($t_S$) the method further comprises:

setting $t_{opt}$ equal to $t_S$;

setting a compensating forecast irrigation amount (cFIA) by:

computing a value $u_1$ indicative of an integral of IR(t) between $t_{L+1}$ and $t_S$;

computing a value $u_2$ indicative of an area S defined by the points $P_1$ and $P_2$ and a fourth point $P_4$=($t_S$, IR($t_S$)), wherein the cFIA is equal to $u_1+u_2$; and generating, as output data, $t_{opt}$ and the cFIA.

According to some embodiments, the method further comprises setting a next irrigation time $t_N$ equal to $t_{opt}$.

According to some embodiments, wherein a next irrigation time $t_N$ is predetermined, when ETa($t_S$)≥IR($t_S$), the method further comprises:

if $t_N=t_{opt}$, generating, as output data, the forecast irrigation amount (FIA); and if $t_N \neq t_{opt}$ obtaining an adjusted FIA (aFIA) by computing a second value $v_2$ indicative of an area A defined by the points $P_1$, $P_3$, and a point $P_5$=($t_N$, IR($t_N$)); and if $t_N<t_{opt}$ setting the aFIA to equal FIA+$v_2$; if $t_N>t_{opt}$ setting the aFIA to equal FIA-$v_2$; and generating, as output data, the aFIA.

According to some embodiments, wherein the next irrigation time $t_N$ is predetermined, when ETa($t_S$)<IR($t_S$), the method further comprises:

extrapolating the line L;

obtaining the point $P_5$ and a point $P_6$ defined by coordinates ($t_N$, L($t_N$)); and setting a compensating forecast irrigation amount (cFIA) by computing a value $w_1$ indicative of an integral of IR(t) between $t_{L+1}$ and $t_N$;

computing a value $w_2$ indicative of an area R defined by the points $P_1$, $P_5$, and $P_6$, wherein the cFIA is equal to $w_1+w_2$; and generating, as output data, the cFIA.

According to some embodiments, when ETa($t_S$)<IR($t_S$), the method further comprises outputting an alert.

According to some embodiments, $Ks^{cur}(t_S)$ is obtained by computing a value indicative of a ratio of a first difference to a second difference, wherein the first difference is defined as a difference between a non-stress water potential taken at $t_S$ from a non-stress reference index of the crop, and the current crop water potential at $t_S$;

the second difference is defined as a difference between the non-stress water potential, and a maximum stress water potential taken at $t_S$ from a maximum stress reference index of said crop.

According to some embodiments, wherein the field area comprises a plurality of subplots, the method further comprises generating a set of irrigation plans, each plan comprising a subplot-specific optimal irrigation time and a corresponding forecast irrigation amount.

According to some embodiments, the subplot area is equal to, or greater than, about 25 m².

According to some exemplary embodiments, the subplot area is equal to about, or greater than, 1 ha (10,000 m²).

According to additional exemplary embodiments, the subplot area is equal to about, or greater than, 2 ha (20,000 m²).

The current water potential can be obtained by any method as is known in the art, including using in-situ measurement data and remote sensing data.

According to some embodiments, the current water potential is obtained from direct water potential measurements using in-situ sensors.

According to some embodiments, the in-situ sensors are selected from the group consisting of plant sensors, soil moisture sensors and a combination thereof.

According to certain exemplary embodiments, the plant sensors are selected from the group consisting of plant mechanical, spectral, and thermal sensor. According to some embodiments, the mechanical sensor is a pressure chamber.

According to certain embodiments, the current crop water potential is computed using remote sensing data. The remote sensing data may reflect the plant canopy status and/or the soil status.

According to certain exemplary embodiments, the remote sensing data are satellite imagery data obtained from one or more satellites.

According to some embodiments, the remote sensing data are obtained from one or more manned or unmanned planes flying at high altitude.

According to some embodiments, the remote sensing data are obtained from one or more drones flying at low altitude above the field.

Any method as is known in the art of using remote sensing data, including satellite imagery data, for evaluation of vegetation and/or soil status can be employed with the teachings of the present invention.

According to some embodiments, the remote sensing data are active and/or passive microwave data of soil moisture.

According to some embodiments, the remote sensing data are infrared crop canopy temperature and/or infrared soil temperature.

According to some currently exemplary embodiments, the remote sensing data are spectral reflectance data of the crop canopy. Typically, each pixel or a plurality of pixels of the image contains data corresponding to a respective area within the field. Accordingly, the water potential computed using the satellite/airplane/drone imagery data may vary within a field and/or among irrigation blocks. Using imagery data with the methods of the present invention may thus advantageously provide for precise individual irrigation plan (including timing and amount) per area (e.g. subplot) adapted to the water stress within the area.

According to some embodiments, the remote sensing data are radar data, LiDAR (Light Detection and Ranging), and/or the like of the crop canopy.

According to some embodiments, each of a plurality of pixels or each group of pixels from the plurality of pixels in a remotely obtained image containing data corresponding to a respective area within the field.

According to some embodiments, one or more remote sensing derived indices (RSDIs) are obtained using the spectral reflectance data of the crop canopy, the infrared crop canopy and/or soil temperature, the radar and or LiDAR data of the crop canopy, the microwave data of the soil, and the current crop water potential is computed therefrom.

According to some embodiments, the Kc values and corresponding ETc values are adjusted based on remote sensing data obtained during the growing period.

According to another aspect, the present invention provides a non-transitory computer readable medium having stored therein instructions executable by a computer system configured to implement the method for managing agricultural irrigation of a crop in an area of a field or a part thereof during a growing period according to the teachings of the invention.

According to yet another aspect, the present invention provides a system for managing agricultural irrigation of a crop in an area of a field or a part thereof, the system comprising:
  a computing environment, the computing environment comprising:
    at least one computer-readable storage medium having computer-executable instructions stored therein and data specifying a crop type, a boundary of the field area, a start and an end of the growing period, and optionally values of a crop coefficient Kc for the growing period; and
    at least one computer processor operably coupled to the at least one computer-readable storage medium and configured by the computer-executable instructions;
  wherein the computing environment is able to:
    receive data indicative of a current crop water potential at a time $t_S$ within the growing period, data indicative of an evapotranspiration (ET0) at $t_S$, and optionally data indicative of a last irrigation time and optionally data indicative of Kc;
    compute a current water stress coefficient $Ks^{cur}(t_S)$;
    compute an actual evapotranspiration (ETa) at $t_S$ ($ETa(t_S)$) of said crop by taking a product of $Ks^{cur}(t_S)$ and a corresponding non-stress crop evapotranspiration (ETc) at $t_S$ ($ETc(t_S)$), wherein $ETc(t_S)=ET0(t_S)*Kc(t_S)$;
    check whether $ETa(t_S) \geq IR(t_S)$, wherein IR(t) is an irrigation recommendation function of the crop; and
    if $ETa(t_S) \geq IR(t_S)$:
      obtain $t_{opt}$ by:
        extrapolating a line L passing through or near a first point $P_1$ and a second point $P_2$, $P_1$ defined by first coordinates $(t_L, ETc(t_L))$ comprising a last irrigation time $t_L$, which is earlier than $t_S$, and ETc at $t_L$, and $P_2$ defined by second coordinates $(t_S, ETa(t_S))$;
      obtain a third point $P_3$, whereat line L intersects, or is tangent to, a curve defined by IR(t); and
      setting $t_{opt}$ to equal the day of the time coordinate of $P_3$; and
      obtain the FIA by:
        computing a value v indicative of an integral of IR(t), between $t_{L+1}$ and $t_{opt}$, wherein $t_{L+1}$ equals $t_L$ plus one day; and
        setting the FIA to equal v.

According to some embodiments, the computing environment is further configured to generate, as output data, $t_{opt}$ and the FIA.

According to some embodiments, for $ETa(t_S) < IR(t_S)$ the computing environment is further configured to:
  set $t_{opt}$ equal to $t_S$;
  obtain a compensating forecast irrigation amount (cFIA) by:
    computing a value $u_1$ indicative of an integral of IR(t) between $t_{L+1}$ and $t_S$;
    computing a value $u_2$ indicative of an area S defined by the points $P_1$ and $P_2$ and a fourth point $P_4=(t_S, IR(t_S))$; and
    setting the cFIA to equal $u_1+u_2$; and
  generate, as output data, $t_{opt}$ and the cFIA.

According to some embodiments, the computing environment is further configured to set a next irrigation time $t_N$ equal to $t_{opt}$.

According to some embodiments, wherein a next irrigation time $t_N$ is predetermined, for $ETa(t_S) \geq IR(t_S)$ the computing environment is further configured to:
  if $t_N=t_{opt}$, generate, as output data, the forecast irrigation amount (FIA); and
  if $t_N \neq t_{opt}$, obtain an adjusted FIA (aFIA) by:
    computing a second value $v_2$ indicative of an area A defined by the points $P_1$, $P_3$, and a point $P_5=(t_N, IR(t_N))$; and
    if $t_N < t_{opt}$:
      setting the aFIA to equal $FIA+v_2$;
    if $t_N > t_{opt}$:
      setting the aFIA to equal $FIA-v_2$; and
  generate, as output data, the aFIA.

According to some embodiments, wherein a next irrigation time $t_N$ is predetermined, for $ETa(t_S) < IR(t_S)$ the system is further configured to:
  extrapolate the line L;
  obtain the point $P_5$ and a point $P_6$ defined by coordinates $(t_N, L(t_N))$; and
  obtain a compensating forecast irrigation amount (cFIA) by:
    computing a value $w_1$ indicative of an integral of IR(t) between $t_{L+1}$ and $t_N$;
    computing a value $w_2$ indicative of an area R defined by the points $P_1$, $P_5$, and $P_6$; and
    setting the cFIA to equal $w_1+w_2$; and
  generate, as output data, the cFIA.

According to some embodiments, for $ETa(t_S) < IR(t_S)$ the computing environment is further configured to output an alert.

According to some embodiments, the computing environment is further configured to obtain $Ks^{cur}(t_S)$ by computing a value indicative of a ratio of a first difference to a second difference;
  wherein the first difference is defined as a difference between a non-stress water potential taken at $t_S$ from a non-stress reference index of the crop, and the current crop water potential at $t_S$; and wherein the second difference is defined as a difference between the non-stress water potential, and a maximum stress water potential taken at $t_S$ from a maximum stress reference index of said crop.

According to some embodiments, wherein the field comprises a plurality of subplots, the computing environment is configured to generate a set of irrigation plans, each plan comprising a subplot specific optimal irrigation time and a corresponding forecast irrigation amount.

According to some embodiments, the subplot area is equal to, or greater than, about 25 m². According to some embodiments, the subplot area is in the range about 1 hectare. According to other embodiments, the subplot area is in the range of about 2 hectares.

According to some embodiments, the computing environment is further configured to have $Ks^{cur}(t_S)$, $ETa(t_S)$, $t_{opt}$, and the FIA permanently stored in the at least one computer-readable storage medium, in a section thereof dedicated to the field.

According to some embodiments, the computing environment is communicatively associated with at least one remote sensing apparatus and/or at least one in situ sensor.

According to some embodiments, the current water potential is obtained using remote sensing data from the at least one remote sensing apparatus and/or in-situ measurement data from the at least one in situ sensor.

According to some embodiments, the remote sensing data comprise images from one or more satellites, one or more drones, and/or one or more airplanes.

According to some embodiments, each pixel or a plurality of pixels in each of the images contains data corresponding to a respective area within the field.

According to some embodiments, the remote sensing data are spectral reflectance data, thermal data, radar data and/or LiDAR data of the crop canopy and/or thermal data and/or microwave data of the soil.

According to some embodiments, the computing environment is further configured to obtain one or more remote sensing derived indices ((RSDIs) using the spectral reflectance data, thermal data, radar data, and/or LiDAR data of the crop canopy and/or the thermal data and/or the microwave data of the soil.

According to some embodiments, the one or more remote sensing derived indices comprise at least one of the vegetation moisture stress reference indices (VMSRIs) as the normalized difference water index (NDWI) or the Wetness index derived from spectral reflectance data in the visible, near infrared (NIR) and short wave infrared (SWIR) spectral bands, and the crop water stress index (CWSI), derived from crop and air temperature measurement data.

According to some embodiments, the crop water potential is obtained using the Wetness, NDWI and/or CWSI.

According to some embodiments, the computing environment is further configured to adjust the Kc values based on remote sensing data obtained during the growing period. According to some embodiments, the computing environment is configured to adjust the Kc values based on one or more remote sensing derived indices comprising at least one of the normalized difference vegetation index (NDVI) and enhanced vegetation index (EVI) using spectral reflectance data in the red and infrared spectral bands, and optionally in the blue spectral band.

According to some embodiments, the line L is straight.

According to some embodiments, the computing environment is further configured to, subsequently to obtaining $t_{opt}$:
compute a current water stress coefficient $Ks^{cur}(t'_S)$, wherein $t_S < t'_S < t_{opt}$;

compute an actual evapotranspiration (ETa) at $t'_S$ (ETa($t'_S$)); and if $ETa(t'_S) \geq IR(t'_S)$:
adjust $t_{opt}$ by:
extrapolating a line L' passing through or near first point $P_1$, second point $P_2$, and point $P'_2$ defined by second coordinates ($t'_S$, $ETa(t'_S)$);
obtaining a point $P'_3$, whereat line L' intersects, or is tangent to, the curve defined by IR(t); and
setting $t_{opt}$ to equal the day of the time coordinate of $P'_3$; and adjust the FIA by:
compute a value v' indicative of an integral of IR(t), between $t_{L+1}$ and $t_N$; and
set the FIA to equal v'.

According to some embodiments, the line L is selected from a family of lines including curved lines.

According to some embodiments, the system further comprises an irrigation controller, located near or within the field, the irrigation controller being configured to receive the output data generated by the computing environment.

According to some embodiments, the irrigation controller is configured to regulate irrigation by an irrigation infrastructure in the field according to the output data received from the computing environment.

It is to be understood that any combination of each of the aspects and the embodiments disclosed herein is explicitly encompassed within the disclosure of the present invention.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiments of methods and/or devices herein may involve performing or completing selected tasks manually, automatically, or a combination thereof. Some embodiments are implemented with the use of components that comprise hardware, software, firmware or combinations thereof. In some embodiments, some components are general-purpose components such as general purpose computers or processors. In some embodiments, some components are dedicated or custom components such as circuits, integrated circuits or software.

For example, in some embodiments, some of an embodiment may be implemented as a plurality of software instructions executed by a data processor, for example which is part of a general-purpose or custom computer. In some embodiments, the data processor or computer may comprise volatile memory for storing instructions and/or data and/or a non-volatile storage, for example a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results).

DETAILED DESCRIPTION OF THE INVENTION

Figure 1:
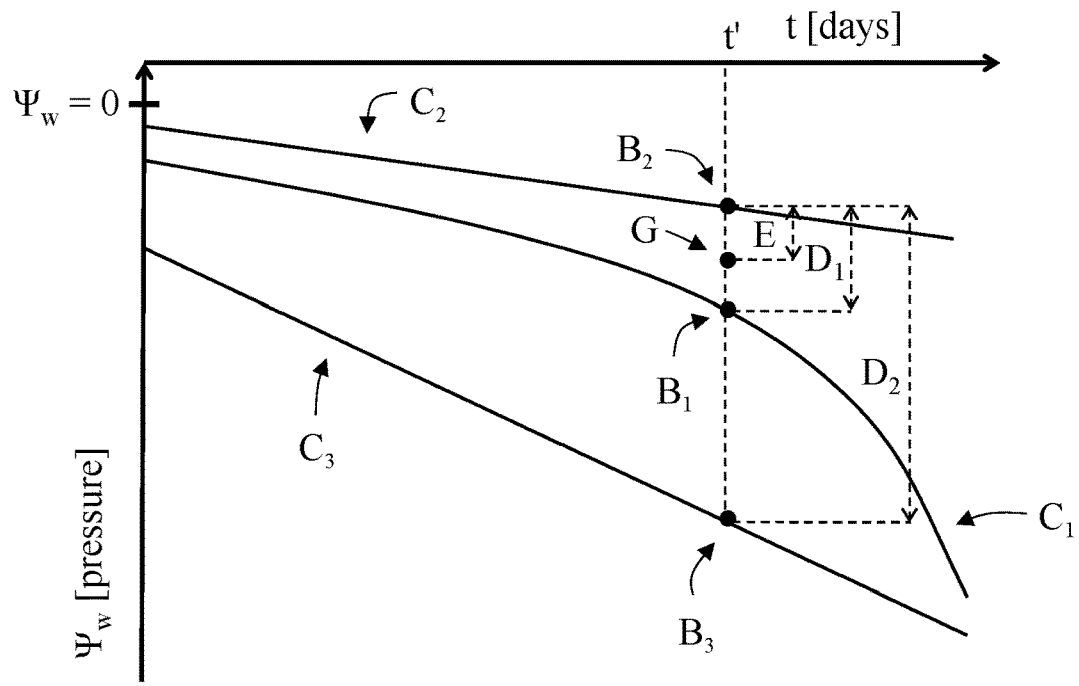
FIG. 1 schematically depicts vegetation moisture stress reference indices (VMSRIs) during a growing period.

The present invention provides methods and systems for forecasting and calculating precise irrigation needs of a crop in a specified area, and optionally delivering an irrigation plan to an end user and/or irrigation controller of an irrigation infrastructure. According to certain embodiments, the present invention performs a water requirement algorithm within a computing environment. The algorithm provides forecasting ahead for the required amount of water delivery based upon a combination of statistical values of historical crop-specific data and data obtained for the crop during the growing season.

As used herein, the term "about" means approximately, in the region of, roughly, or around. A parameter or quantity is said to be "about", or equal to "about", a numerical value (e.g. an area equals about 1000 m$^2$) when it is within a range, thereby extending the boundaries above and below the numerical values set forth. In general, the term "about" is used herein to modify a numerical value above and below the stated value by a variance of 10%. According to some embodiments, "about" is used herein to modify a numerical value above and below the stated value by a variance of 15%. According to some embodiments, "about" is used herein to modify a numerical value above and below the stated value by a variance of 20%.

As used herein, the term "recent" with respect to data, such as measurement data from which the value of a physical quantity/parameter (e.g. crop water potential) is obtained (e.g. derived), refers to past measurement data within the growing period or season up until a day prior to the present time-point, for example, data of measurements carried out two days prior, one week prior, or even two weeks prior to the present time-point.

As used herein, "current" with respect to a value of a physical quantity/parameter, such as crop water potential or actual evapotranspiration, refers to the present value or an estimated value of the physical quantity/parameter. The value can be determined based on measurement data obtained within the same (present) day and/or recent measurement data. In particular, measurement data obtained at given time-point(s) can be used to estimate (forecast) the value of a physical quantity at a later time-point (within the same growing period or season, e.g. several days after the first time-point(s)). When the later time-point coincides with the present time, the estimated value may be referred to as the current value.

It is to be understood that reference to a current value as having been determined based on recent measurement data, covers the possibility that the current value is an estimated value derived from recent measurement data. For example, the current value of crop water potential may refer to an estimated value based on recent satellite imagery of the crop canopy and weather forecasts from around the time the satellite imagery was obtained. Further, for example, the current value of actual evapotranspiration may refer to an estimated value based on recent weather station data.

As used herein, "reference data" refers to historical data from previous growing seasons or periods (e.g. growing seasons before the present growing season). The expressions "reference data", "historical data", and "archive" may be used interchangeably.

The terms "growing period" and "growing season" are used herein interchangeably, and refer to the time of a crop growth cycle. The growing period is crop specific, and accordingly its start and/or end points may vary for each crop. According to certain embodiments, the growing period start point is at seeding or planting. According to other embodiments, when the crop is a perennial crop, particularly tree, the growing period start point is at bud break or after harvesting the yield of a previous growing period. According to certain embodiments, the growing period end point is at harvest and/or senescence of the crop plants.

As described hereinbelow, "time" refers to a calendar day, to a time and date, to a day number as counted from the start of the growing season, to the time as measured from the start of the growing season, or to growing degree day (GDD).

The systems and methods of the present invention are applicable to agricultural crops at a spatial resolution of irrigation blocks (subplots). The area of the irrigation blocks would depend on the resolution of the obtained in situ and/or spectral data, the obtained meteorological data, area of the entire field and the user (crop grower) needs. According to some embodiments, the subplot area is about 25 m$^2$, about 1,000 m$^2$, about 10,000 m$^2$ (1 ha) or about 20,000 m$^2$ (2 ha).

According to certain embodiments, the system and methods of the present invention include several components, defining parameters and/or activities required to generate the irrigation plan.

Data and Coefficients

Weather Conditions

The weather conditions are typically obtained from an online weather service record (online weather database) or from a meteorological station located in the vicinity of the field area to be irrigated, for example, within a distance of up to about 10 kilometers from the field. According to certain embodiments, the weather condition are obtained from a hyperlocal weather services which can specify the weather conditions to a resolution of several kilometers, for example 5 km×5 km. According to certain embodiments, the weather conditions are reflected by a value of daily evapotranspiration and/or mean daily evapotranspiration calculated for a known period (ET0). The function ET0(t), wherein t denotes time, represents the dependence of the evapotranspiration on the time t. According to some embodiments, the function ET0(t) is discrete, for example, when the time t specifies a day, a couple of days, or even a week or two weeks (i.e. the temporal resolution may be at the level of a day or a number of days). According to some embodiments, ET0(t) may be specified to within an hour or even minutes. According to some embodiments, ET0(t) is a continuous function, e.g. obtained by interpolating between a set of values of the evapotranspiration at different times. According to some embodiments, ET0(t) consists of three points, two points, or even a single point (i.e. ET0(t) is specified at three different times, two different times, or at a single time, respectively).

As used herein, according to some embodiments, "time" refers to a calendar day, to a time and date, to a day number as counted from the start of the growing season, or to the time as measured from the start of the growing season. According to some embodiments, "time" refers to (i.e. is measured by) a growing degree day (GDD), in which case the "time" is possibly not linear in calendar days.

Similarly, throughout the application, functions representing the time-dependence of physical quantities/parameters, scheduled operations, and the like, may be discrete or continuous, as explained above with respect to ET0(t). In particular, some time-dependent functions may be known in advance (pre-determined), e.g. when representing seasonal averages known in the art, or, for example, may be updated during the growing season as new data is accumulated (e.g. from weather stations, satellites, sensors in the field, etc.). In particular, when the function is discrete each update may involve increasing by one the number of points that define the function. For example, at the first day of the growing season evapotranspiration data may be received so that the function ET0(t) includes a single point: the value of ET0 at the time $t_1$ (i.e. the first day). At the second day of the growing season new evapotranspiration data may be received so that the updated function ET0(t) includes two pointS; the value of ET0 at the time $t_1$ and the value of ET0 at the time $t_2$ (i.e. the second day), and so on. According to some embodiments, the received data includes an estimate (forecast) of the evapotranspiration at a later time-point (e.g. the next day, next week or even next two weeks). According to some embodiments, the received data together with weather forecast data are used to estimate the evapotranspiration at a later time-point. When the later time-point coincides with the present time, the received data may be referred to as recent data, and the current evapotranspiration may be referred to as having been derived (estimated) based on the recent measurement data. According to some embodiments, the received weather conditions can be used to estimate the evapotranspiration at an earlier time-point for which no data were available.

According to certain embodiments, the value of ET0 at time t can be obtained from historical data representing seasonal averages of ET0.

Last Irrigation Time ($t_L$).

The last irrigation time $t_L$ refers to the time (for example, in terms of a day) within the crop growing period in which irrigation has last been applied to the field or part thereof (irrigation block) to which the irrigation plan (the next irrigation amount and optionally the irrigation time) is to be provided.

According to certain embodiments, at $t_L$ the crop received an amount of water to bring the crop water potential substantially to non-stress level.

It is to be explicitly understood that the expression "last irrigation" encompasses any form of irrigation bringing the crop water potential to a non-stress or near non-stress level, including natural precipitations and agricultural irrigation.

Crop Plant Water Potential

The values of crop water potential can be obtained based on any method known in the art, including, but not limited to, in situ measurements of leaf and/or stem water potential of representative plants using plant sensors (e.g. pressure chambers); in situ measurements of soil water status, typically using soil moisture sensors; temperature and/or microwave data of soil moisture obtained by remote sensing (e.g. satellites); spectral and/or temperature data of crop canopy obtained by remote sensing (e.g. satellite or manned or unmanned airplane imagery) as described hereinbelow; images of crop canopy from towers located near or within the field, or from low-flying drones; and any combination thereof.

Crop Coefficient (Kc)

The Kc coefficient serves as a quantifier of the physical and physiological differences between crops. The crop coefficient Kc to be used with the teachings of the present invention can be obtained from published tabular values, for example those listed in FAO 56. According to the FAO recommendations, changes in vegetation and ground cover mean that the crop coefficient Kc varies during the growing period. Accordingly, the trends in Kc during the growing period are represented in a crop coefficient curve. Using the tabular values (reference Kc values), only three values for Kc are typically required to describe and construct the crop coefficient curve: those during the initial stage ($Kc_{ini}$), the mid-season stage ($Kc_{mid}$) and at the end of the late season stage ($Kc_{end}$). Alternatively and/or additionally, crop canopy cover or reflectance data relying on remote sensing data can be used to obtain Kc throughout the growing period of the crop. The function Kc(t) represents the dependence of Kc on the time t.

Kc relates the evapotranspiration ET0 to the non-stress evapotranspiration ETc. For given values of ET0 and Kc, the corresponding value of ETc is given by the product thereof, i.e. the non-stress evapotranspiration ETc.

The function ETc(t), represents the dependence of ETc on the time t. In particular, ETc(t)=ET0(t)*Kc(t), wherein ET0 (t) is the value of the evapotranspiration at a time t during the growing period.

It is to be explicitly understood that Kc(t) values can be obtained from published values (i.e. reference or historical values) or can be derived from recent and/or present measurements. According to certain embodiments, Kc(t) values are derived from current data obtained using remote sensing.

Today's commercially-available Earth observing satellite systems cover areas of thousands of square kilometers with pixels that define the image resolution from decimeters to tens of meters. Calculations at the regional scale are accomplished using data rasters in which values vary spatially across regions. The pixel size is an important consideration because it determines the resolution at which a field can be evaluated.

According to certain embodiments, the remote sensing data are satellite imagery data. Typically, satellite imagery data may be given at a resolution of about 1,000 m² (e.g. each pixel represents an area of about of 32 m×32 m). According to some embodiments, the satellite imagery data is of high resolution, with each pixel representing an area as small as about 25 m².

According to some embodiments, the remote sensing data include crop canopy reflectance data. According to certain embodiments the canopy reflectance is selected from the blue (B) band, green (G) band, red (R) band, near-infra-red (NIR) band, the short-wave-infrared-1 (SWIR1) band, the short-wave-infrared-2 (SWIR2) band and any combination thereof.

According to some embodiments, one or more of the remote sensing derived indices are computed and the crop water potential and/or the crop coefficient Kc are obtained therefrom.

According to certain embodiments, the remote sensing derived indices include, but are not limited to:
(i) the normalized difference vegetation index (NDVI) defined via NDVI=(NIR−R)/(NIR+R);
(ii) the enhanced vegetation index (EVI) defined via EVI=2.5*((NIR−R)/(NIR+6*R−7.5*B+1);
(iii) the wide dynamic range vegetation index (WDRVI) defined via WDRVI=(0.2*NIR−R)/(0.2*NIR+R);
(iv) the modified NDVI defined via (NIR−R)/(NIR+R−SWIR2);
(v) the red-green simple ratio (R/G) defined via R/G;
(vi) the blue-red simple ratio (B/R) defined via B/R;
(vi) the Wetness index defines via (B*0.14+G*0.18+R*0.33+NIR*0.34−SWIR1*0.62−SWIR2*0.42)
(viii) the normalized difference water index (NDWI) defined via (NIR−SWIR)/(NIR+SWIR);
(ix) the SWIR−NIR index defined via (SWIR1+SWIR2)/(NIR); and
(x) the crop water stress index (CWSI) defined via=(dT−dTl)/(dTu−dTl).

In the description above, R and NIR stand for spectral reflectance measurements acquired in the red (visible) and near-infrared regions, respectively;

G and B stand for spectral reflectance measurements acquired in the green and blue regions, respectively;

SWIR stands for spectral reflectance measurements acquired in the short wave infrared region.

Spectral reflectance is dimensionless being a ratio of the reflected radiation over the incoming radiation in the corresponding spectral band. Hence, the spectral reflectance assumes values between 0.0 and 1.0. By design, the NDVI thus varies between −1.0 and +1.0.

dT is the difference between crop canopy temperature and air temperature; dTu is the upper limit of canopy temperature minus air temperature (non-transpiring crop); and dTl is the lower limit of canopy temperature minus air temperature (well-watered crop).

According to some embodiments, the remote sensing data include thermal infrared images of the crop canopy, and the crop water potential, and/or the crop coefficient Kc are obtained therefrom.

The inventors of the present invention have previously attempted mapping the crop coefficient (Kc) for cotton and process tomato based on Landsat-8 and Sentinel-2 satellite imagery on a field level. Data (not shown) were collected from 12 cotton plots and 5 tomato plots during the 2016 growing seasons. The dataset for each plot included vegetation height and crop cover, growth stage, irrigation timing and amounts, and the corresponding satellite imagery. For each crop, two of the plots were utilized to define the best imagery vegetation index to map the crop height and crop cover. These vegetation indices were then transformed into the cotton height and the tomato cover on a pixel and plot level for the rest of the plots. All the indices tested had an error of 15% or below, with a higher accuracy for the enhance vegetation index (EVI) and the normalized difference vegetation index (NDVI). These two indices were then utilized in published equations for calculating crop coefficient (Kc) and the values obtained were compared to the United Nations Food and Agriculture Organization Kc (Allen et al. 2009 ibid; FAO Irrigation and Drainage Paper No. 56). It was shown that the method used is suitable for mapping Kc on a field area level as small as 1 hectare (ha) (Beeri et al, 2017, The 11th European Conference on Precision Agriculture (ECPA 2017), Edinburgh, UK).

Vegetation Moisture Stress Reference Indices (VMSRIs)

Plant tolerance to water stress varies during the growing period of a crop plant. As used herein, plant tolerance refers to the plant capacity to recover after being exposed to a stress. The plant is recovered when at least one of growth, biomass, yield, fertilizer use efficiency, water use efficiency or a combination thereof is essentially not negatively affected by the stress. According to certain exemplary embodiments, the stress is a water stress.

The present invention provides and utilizes three vegetation moisture stress reference indices:

Non-Stress Reference Index

Figure 2:
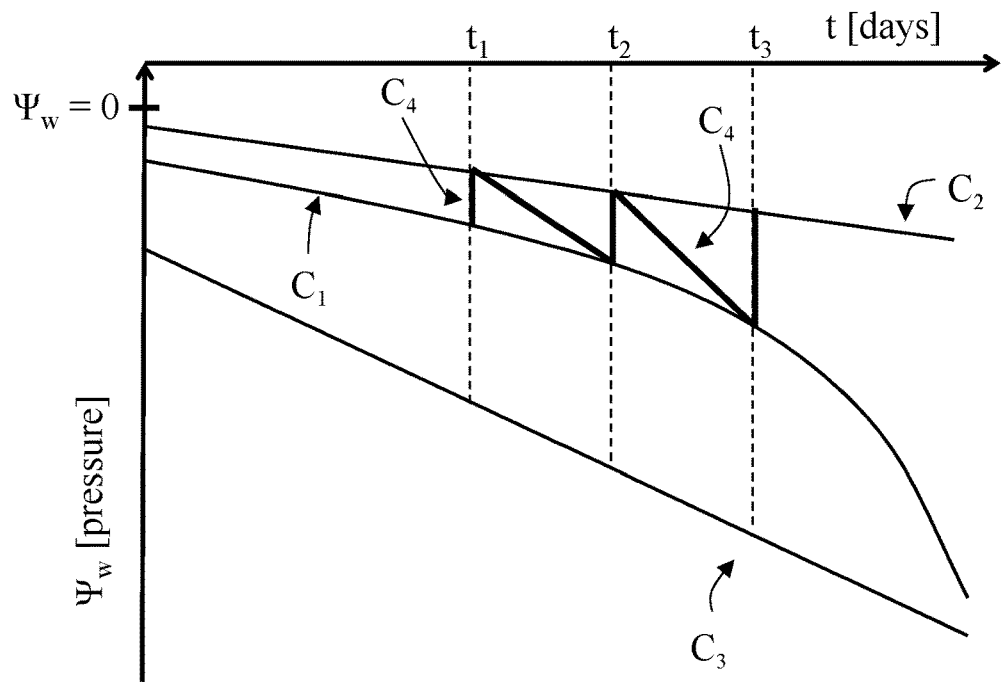
FIG. 2 is a schematic presentation of irrigation effect on crop water potential during a growing season.

The non-stress reference index describes the water potential of a crop plant or an average water potential value of a plurality of crop plants, as a function of time during the growing period thereof, when grown under non-limiting soil water conditions. FIGS. 1 and 2 present the non-stress reference index.

Maximum-Stress Reference Index

The maximum-stress reference index describes the most negative (i.e. the maximum in absolute value) water potential of a crop plant, or an average water potential value of a plurality of crop plants, as a function of time during the growing period thereof, when grown under limiting soil water conditions to which the plant is tolerant. FIGS. 1 and 2 present the maximum stress reference index.

Recommended Stress Reference Index (Also Referred to Herein as Irrigation Strategy)

As described hereinabove, accumulated research has shown that deficit irrigation (i.e. irrigation at an amount less than the amount resulting in non-limiting soil water conditions) can provide high water efficiency and/or crop productivity in terms of costs and yield. In addition, crops often have varying water stress sensitivity at different growth stages, and thus the plant may be subjected to more stress at periods when the stress will have a smaller impact on yield. The recommended stress reference index reflects the time-dependence of the recommended water potential of a crop plant during the crop growing period. The recommended stress index is presented in FIGS. 1 and 2.

Typically, the VMSRIs are obtained using historical data (seasonal averages). According to some embodiments, the VMRSIs can be adjusted during the growing season.

Methods

Ks Computation

The present invention now provides a novel computational method to set a Ks value. In certain embodiments, the computed Ks value is based, inter alia, on present and/or recent measurements, thus reflecting the actual stress the crop is experiencing ($Ks^{cur}$). According to certain embodiments, the computed Ks value is derived using a recommended stress reference index of the crop to be irrigated ($Ks^{ex}$).

Making reference to FIG. 1, a first curve $C_1$ delineates a recommended stress reference index of the crop during a growing period thereof, as described hereinabove. A second curve $C_2$ delineates a non-stress reference index of the crop during the growing period, as described hereinabove. A third curve $C_3$ describes a maximum stress reference index of the crop during the growing period, as described hereinabove.

Also indicated in FIG. 1 are points $B_1$, $B_2$, and $B_3$ along $C_1$, $C_2$, and $C_3$, respectively, corresponding to a time t=t', e.g. on a specific day within the growing period. A point G denotes the water potential of the crop at t' (the current crop water potential), which is obtained from recent and/or present measurements (e.g. obtained from field measurements using ground (in situ) sensors, such as plant and/or soil sensors, or derived from remote sensing imagery data, such as satellite imagery data from the same day or from a number of days earlier).

The method for calculating $Ks^{cur}/Ks^{ex}$ includes:
Obtaining a current water potential of a crop at t' (the value of the current water potential is given by the y (vertical) coordinate of G) from current and/or recent measurement data; or
obtaining a recommended water potential of the crop at t' (given by the y coordinate of $B_1$) from the recommended stress reference index of the crop.
Computing a first difference between the non-stress water potential value at t' (given by the y coordinate of $B_2$), which is obtained from the non-stress reference index of the crop, and the current water potential of the crop at t', or the recommended water potential of the crop at t'.
Computing a second difference between the non-stress water potential value and the maximum stress water potential value at t' (given by the y coordinate of $B_3$), which is obtained from the maximum stress reference index.
Computing a ratio, or a value indicative thereof, of the first difference to the second difference (i.e. $E_1/D_2$ or $D_1/D_2$), wherein the computed ratio value is $Ks^{cur}$ or $Ks^{ex}$, respectively.

$E_1$, which designates the distance between G and $B_2$, indicates the first difference when computed using the current water potential of the crop (i.e. as obtained from present and/or recent measurements). $D_1$, which designates the distance between $B_1$ and $B_2$, indicates the first difference when computed using the recommended stress reference index of the crop. $D_2$, which designates the distance between $B_3$ and $B_2$, indicates the second difference.

When the computation of Ks is based on present and/or recent water potential measurements, Ks is referred to herein as current Ks ($Ks^{cur}$). The function $Ks^{cur}(t)$ gives the dependence of $Ks^{cur}$ on time (e.g. on the calendar day).

When the computation of Ks is based on the recommended stress reference index, Ks is referred to herein as expected Ks ($Ks^{ex}$). The function $Ks^{ex}(t)$ gives the dependence of $Ks^{ex}$ on time.

Actual Crop Evapotranspiration ETa

The actual evapotranspiration of a crop is obtained by taking the product of the non-stress evapotranspiration of the crop ETc and $Ks^{cur}$. When $Ks^{cur}=1$, the actual evapotranspiration of the crop equals the non-stress evapotranspiration of the crop.

The function ETa(t), represents the dependence of ETa on the time t. The actual crop evapotranspiration at time t (ETa(t)) is computed by the equation:

$$ETa(t)=ET0(t)*Kc(t)*Ks^{cur}(t)=ETc(t)*Ks^{cur}(t)$$

It is to be explicitly understood that the values of ET0 and $Ks^{cur}$ are not necessarily obtained from respective measurement data corresponding to the same time. For example, $ETa(t_a)$ can be obtained from $Ks^{cur}$ measurement data corresponding to a measurement performed at $t_a$, and ET0 measurement data corresponding to a measurement performed at a time $t_b > t_a$. The value of ET0 at time $t_a$ is then deduced from the value thereof at $t_b$. Such a scenario is pertinent, for example, when at time $t_a$ no measurement data was available to derive $ET0(t_a)$.

According to some embodiments, both $Ks^{cur}$ and ET0 are obtained from recent or present measurement data. Kc(t) can be obtained as described hereinabove.

Irrigation Recommendation (IR)

An irrigation recommendation function IR(t) gives the recommended daily amount of water to be applied to a crop during the growth period. An irrigation recommendation for an entire growth period can be computed according to the FAO No. 56 instructions (ibid) and further publications (for example Allen R G and Pereira L S., 2009. Irrig Sci 28:17-34). Irrigation recommendation may be also based on data obtained for specific crops (for example, Conceição N et al., 2017. Agricultural Water Management 191:138-152; Kopyt M and Tsadok S., Grapegrower & Winemaker July 2015, pp. 44-48).

According to certain embodiments, the IR function utilized with the teachings of the present invention is essentially based on daily values of ET0, Kc and $Ks^{ex}$. More specifically, $IR(t)=ET0(t)*Kc(t)*Ks^{ex}(t)$. According to some embodiments, ET0 values used in obtaining the function IR(t) are historical corresponding to seasonal averages of ET0. According to some embodiments, ET0 values used in obtaining the function IR(t) are values obtained during the growing season (i.e. recent and present and forecast for the next week or two). In such a scenario the function IR(t) is progressively obtained with the progress of the growing season, as new ET0 values are obtained/derived/forecasted.

FIG. 2 schematically depicts the actual crop water potential, indicated by a curve $C_4$, during a series of consecutive irrigations, according to the teachings of the present invention. Depicted are three irrigations at times $t_1$, $t_2$, and $t_3$, wherein $t_1 < t_2 < t_3$. Immediately following each irrigation the actual crop water potential increases (decreases in absolute value) to non-stress level, and Ks becomes equal to one. The actual crop water potential then gradually decreases (increases in absolute value) until reaching recommended stress levels (i.e. reaching a corresponding point on curve $C_1$), at which time the crop is irrigated again.

Computation of the Forecast Irrigation Amount (FIA) at a Next Irrigation Time $t_N$ Relative to the Last Irrigation Time $t_L$ The present invention now discloses novel computational methods to determine the amount of irrigation that should be applied to a crop to maintain the water potential at and/or between the recommended stress and the non-stress water potential of the crop, as well as determining the optimal time for applying the irrigation. It is to be understood that the term "optimal" used herein with respect to irrigation time refers to the most recommended time point (present or future) for irrigation based on the methods of the present invention.

Figure 3A:
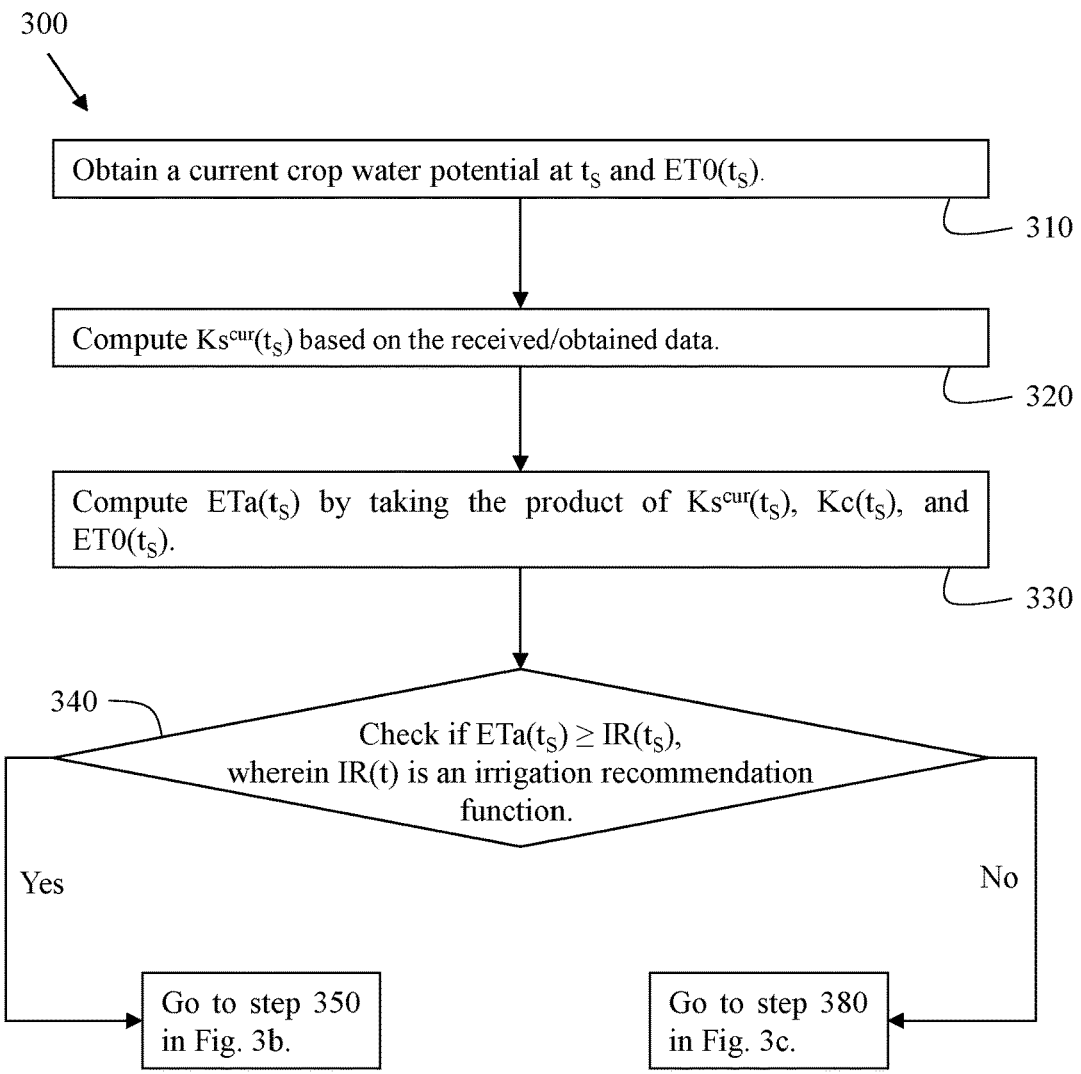
FIGS. 3a-3c present a flowchart of a method for determining an optimal irrigation time and forecast irrigation amount(s) corresponding to the optimal irrigation time, according to certain embodiments of the present invention.
Figure 3B:
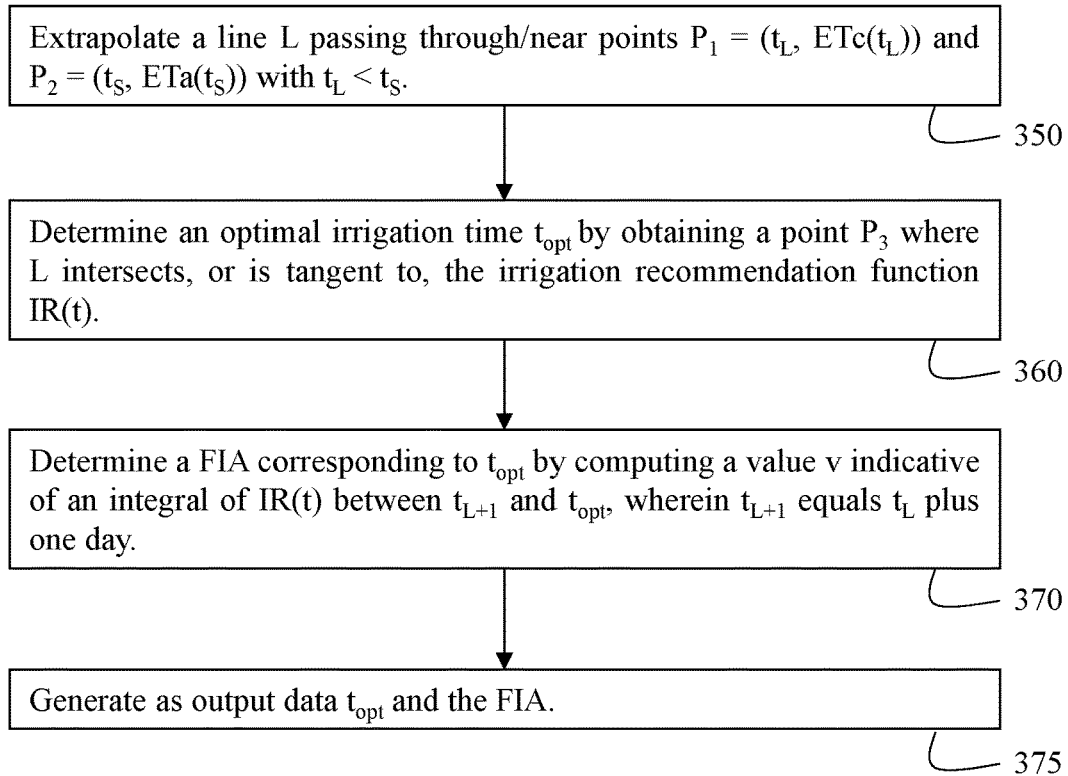
Figure 3C:
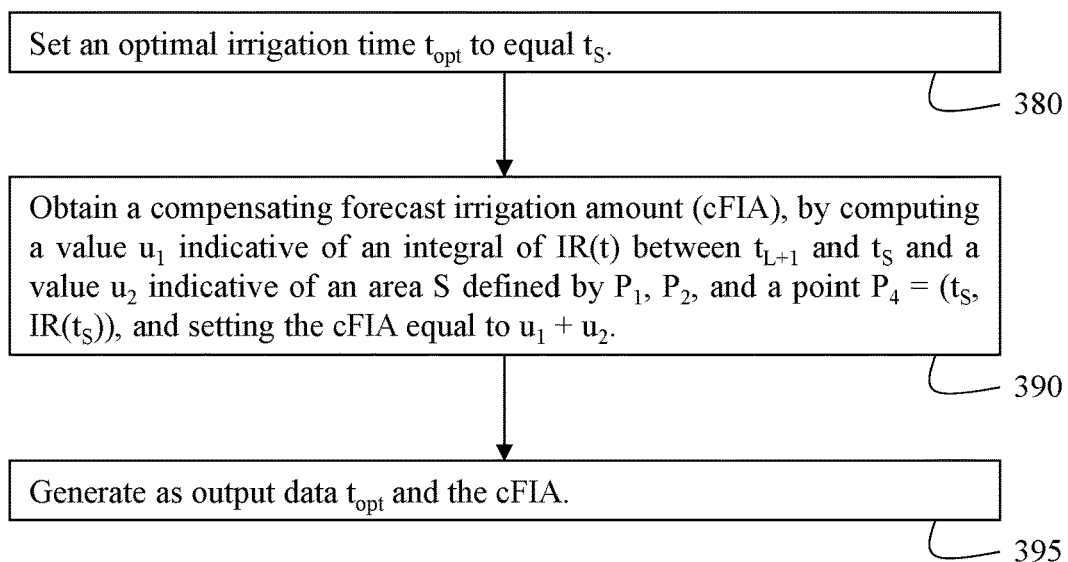

FIGS. 3a-3c depict a flow chart of an example method 300 to determine an optimal irrigation time $t_{opt}$, following a last irrigation/precipitations at a time $t_L$, and to compute a corresponding forecast irrigation amount (FIA) to be applied at the day of $t_{opt}$. Method 300 includes:

A step 310 wherein values of a current crop water potential $\Psi_w^{cur}$ at $t_S$ ($\Psi_w^{cur}(t_S)$) and a current value of evapotranspiration at $t_S$ ($ET0(t_S)$) are obtained.

A step 320 wherein $Ks^{cur}(t)$ is obtained (based on the data received in step 310), as explained above in the subsection Ks computation and demonstrated in FIG. 1.

A step 330 wherein $ETa(t_S)$ is computed by taking the product of $Ks^{cur}(t_S)$, $Kc(t_S)$, and $ET0(t_S)$.

A step 340 wherein it is checked if $ETa(t_S) \geq IR(t_S)$, wherein $IR(t)$ is an irrigation recommendation function.

Contingent on $ETa(t_S)$ being greater than, or equal to, $IR(t_S)$:

A step 350 wherein a line L is extrapolated passing through or near points $P_1$ and $P_2$, defined by coordinates $(t_L, ETc(t_L))$ and $(t_S, ETa(t_S))$, respectively, with $t_L < t_S$.

A step 360 wherein the optimal irrigation time $t_{opt}$ is determined by obtaining a point $P_3$ wherein L (first) intersects $IR(t)$, or is (first) tangent to $IR(t)$, and setting $t_{opt}$ equal to the day of the time coordinate of $P_3$.

A step 370 wherein the FIA corresponding to $t_{opt}$ is determined by computing a value v indicative of an integral of $IR(t)$ between $t_{L+1}$ and $t_{opt}$, wherein $t_{L+1}$ equals $t_L$ plus one day (e.g. 24 hours).

A step 375 wherein $t_{opt}$ and the FIA are generated as output data.

Contingent on $ETa(t_S)$ being smaller than $IR(t_S)$:

A step 380 wherein $t_{opt}$ is set to equal $t_S$.

A step 390 wherein a compensating forecast irrigation amount (cFIA), corresponding to $t_{opt}$, is determined by computing a value $u_1$ indicative of an integral of $IR(t)$ between $t_{L+1}$ and $t_S$ and value $u_2$ indicative of an area S defined by the points $P_1$, $P_2$, and a point $P_4 = (t_S, IR(t_S))$, and taking the sum of $u_1$ and $u_2$ to equal the cFIA.

A step 395 wherein $t_{opt}$ and the cFIA are generated as output data.

Steps 310-340, steps 350-375, and steps 380-395 are outlined in FIG. 3c. FIG. 3b, and FIG. 3c, respectively.

A next irrigation time $t_N$ is defined by the day on which $t_{opt}$ falls, i.e. $t_N$ is set equal to $t_{opt}$. According to some embodiments, $$FIA = \int_{t_{L+1}}^{t_N} IR(t).$$

According to some embodiments, for example, embodiments wherein $IR(t)$ is a discrete function, specified by daily values, $$FIA = \sum_{t_{L+1}}^{t_N} IR(t).$$

Figure 4A:
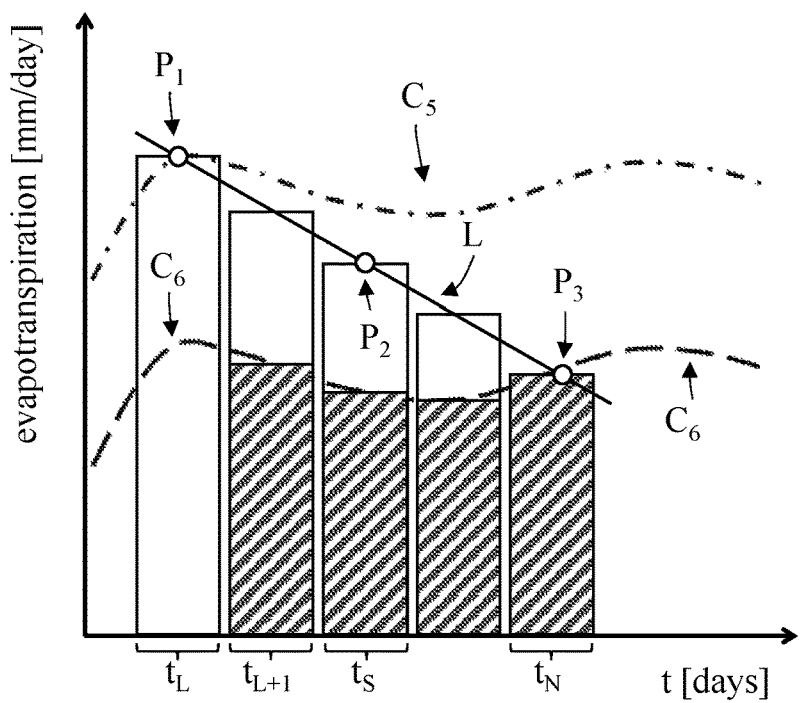
FIG. 4a schematically depicts the computation of a next irrigation time $t_N$ and a forecast irrigation amount corresponding thereto, when an actual evapotranspiration rate at $t_S$ (ETa($t_S$)) is greater or equal a value of an irrigation recommendation function at $t_S$ (IR($t_S$)).

Steps 350-370 in a specific embodiment of method 300 are depicted in FIG. 4a. A dashed-dotted curve $C_5$ delineates $ETc(t) = ET0(t) * Kc(t)$, that is to say, the crop evapotranspiration at non-stress (i.e. when $Ks=1$). A dashed curve $C_6$ delineates the recommended irrigation function $IR(t)$. According to some embodiments, $IR(t) = ETc(t) * Ks^{ex}(t)$, wherein $Ks^{ex}(t)$ is obtained as described herein above from the non-stress, maximum stress, and recommended reference indices plotted in FIG. 1 by computing the ratio of $D_1$ to $D_2$ at time t. $P_1$ is located along $C_5$ at $t_L$. The y coordinate (i.e. the second coordinate) of $P_1$ gives the actual evapotranspiration of the crop immediately following irrigation/precipitations which brings the crop water potential to non-stress level. A point $P_3$, is defined as the point whereat L and $IR(t)$ (first) intersect or are (first) tangent. The height of the empty vertical bars (which are partially hidden by the diagonally-striped vertical bars) indicates the value of the actual evapotranspiration, as estimated by the extrapolation, i.e. by line L. The FIA is shown as given by a sum of the average daily values of $IR(t)$ (which equals the integral of $IR(t)$ between $t_{L+1}$ and $t_N$), as indicated by the diagonally-striped vertical bars.

In FIG. 4a recent and/or present measurement data are received at time $t_S$—two days after the last irrigation/precipitations time. According to some embodiments, the crop water potential at $t_S$ at one or more irrigation blocks (subplots) in the field is derived from (or specified by) the measurement data and $Ks^{cur}(ts)$ per each irrigation block is derived therefrom. According to some embodiments, the measurement data specify $ET0(t_S)$. The measurement data are used to derive the actual evapotranspiration of the crop at $t_S$ ($ETa(t_S)$).

Line L, which in FIG. 4a is shown as being straight may generally be curved, in particular when measurement data are received at more than a single time-point or correspond to more than a single time-point, as further elaborated below and in the description of FIG. 4c. Line L may be obtained by a curve fitting procedure, e.g. by finding a curve, from a given family of curves, which minimizes the distances to points $P_1$ and $P_2$, respectively. Line L in FIG. 4a intersects $IR(t)$ ($P_3$) at $t_{opt} = t_N$ (at the fourth day after the last irrigation/precipitations).

It is noted that not all of the data received at step 310 need necessarily be received at the same time, e.g. at $t_S$ (even when $t_S$ is specified to within a day, i.e. represents a day). For example, the evapotranspiration may be estimated on a weekly basis, or even every two weeks, in which case the evapotranspiration may be obtained prior to $t_S$, e.g. two days or three days before, while at $t_S$ data indicative of the plant water potential are received.

The data received at step 310 may be received from weather stations (i.e. evapotranspiration data), satellites (remote sensing data), from an online server receiving data from various sources, for example data from multiple satellites and weather services, and the like, as elaborated on below.

Figure 4B:
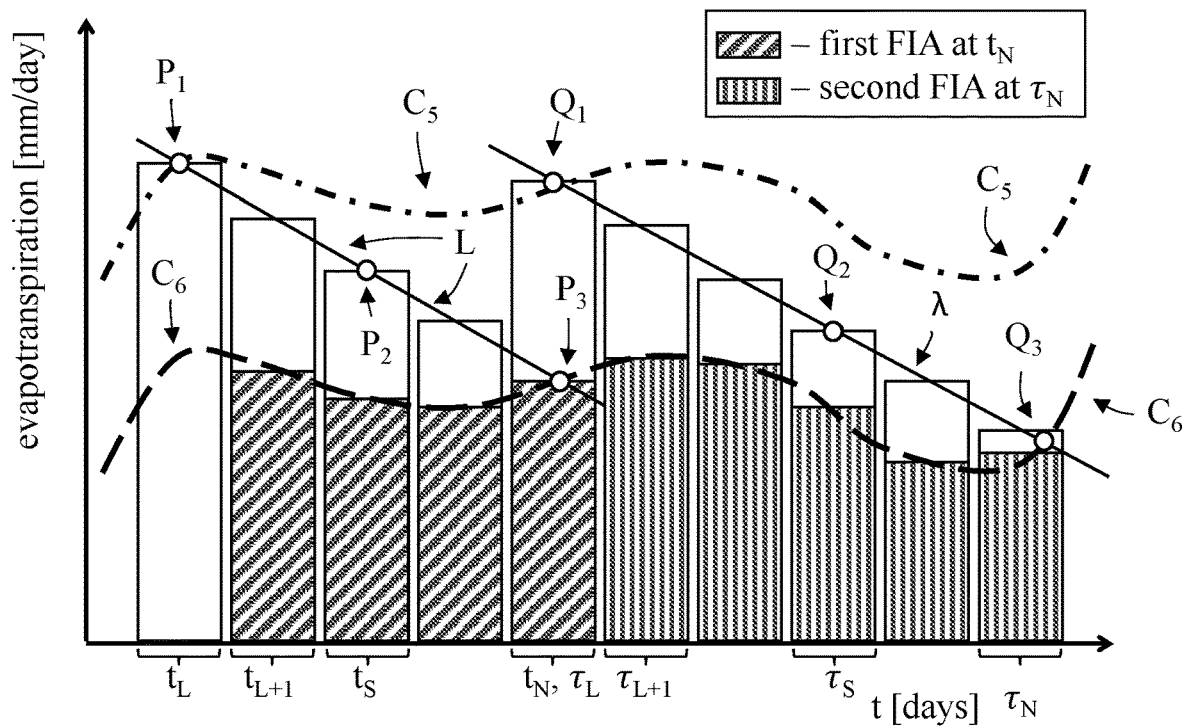
FIG. 4b schematically depicts the computation of two consecutive next irrigation times and two consecutive forecast irrigation amounts corresponding to the two consecutive irrigations times, respectively.
Figure 4C:
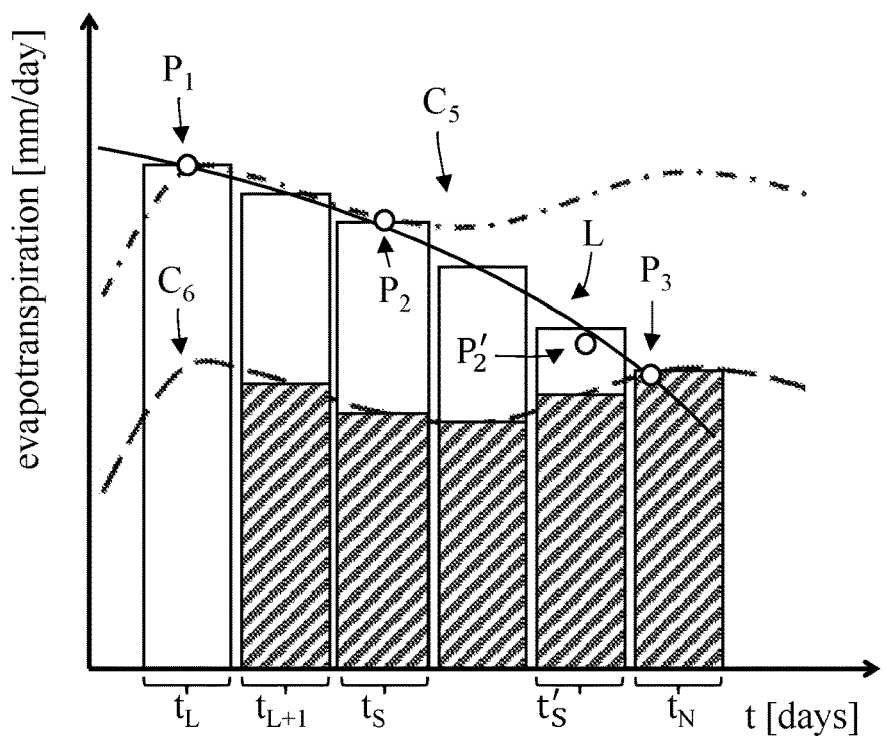
FIG. 4c schematically depicts the computation of a next irrigation and a forecast irrigation amount corresponding thereto, based on measurement data from two different time-points.

FIG. 4b depicts two consecutive applications of method 300 in a specific embodiment thereof. In the first application, $t_{opt}$ and FIA (to be applied at $t_N = t_{opt}$) are computed. In the second application—following an irrigation at $t_N$ which brings the crop water potential to non-stress level—a second optimal irrigation time $\tau_{opt}$ and a corresponding second forecast irrigation amount, to be applied at $\tau_N = \tau_{opt}$, are computed. The first forecast irrigation amount corresponding to $t_N$ is indicated by the four diagonally striped bars. The second forecast irrigation amount corresponding to $\tau_N$ is indicated by the five vertically striped bars.

It is noted that $\tau_L = t_N$ and $Q_1 = (\tau_L, ETc(\tau_L))$. In a repetition of step 310, values of a current crop water potential at $\tau_S$ and an evapotranspiration at $\tau_S$ ($ET0(\tau_S)$) are obtained. Steps 320-370 are then repeated to obtain $\tau_{opt}$ (and $\tau_N$, which equals $\tau_{opt}$) and a corresponding FIA. Specifically, $Q_2 = (\tau_S, ETa(\tau_S))$, wherein $ETa(\tau_S)$ is the actual evapotranspiration at $\tau_S$ obtained in the repetition of step 330. In the repetition of step 350 a line $\lambda$ is extrapolated passing through or near $Q_1$ and $Q_2$. A point $Q_3$ indicates the point whereat $\lambda$ (first) intersects or is (first) tangent to IR(t). $\tau_{opt}(=\tau_N)$ equals the day of the time coordinate of $Q_3$.

While FIG. 4b depicts the scenario when $ETa(t_S) \geq IR(t_S)$ and $ETa(\tau_S) \geq IR(\tau_S)$, it is evident that method 300 can also be applied when $ETa(t_S) < IR(t_S)$ and/or $ETa(\tau_S) < IR(\tau_S)$.

According to some embodiments of method 300, when $ETa(t_S) \geq IR(t_S)$, following step 360, wherein $t_{opt}$ is determined, additional measurement data may be obtained corresponding to a time $t'_S$ later than $t_S$, but before $t_{opt}$ (i.e. $t_S < t'_S < t_{opt}$). The optimal irrigation time (and consequently the next irrigation time) and the FIA may then be accordingly adjusted. For example, additional measurement data corresponding to a time $t'_S$ are obtained, from which an actual evapotranspiration at $t'_S$ ($ETa(t'_S)$) is obtained (by repeating steps 310-330 with respect to the additional measurement data). Line L may then be extrapolated (or adjusted) taking into account an additional point $P'_2 = (t'_S, ETa(t'_S))$, as depicted in FIG. 4c.

Figure 4D:
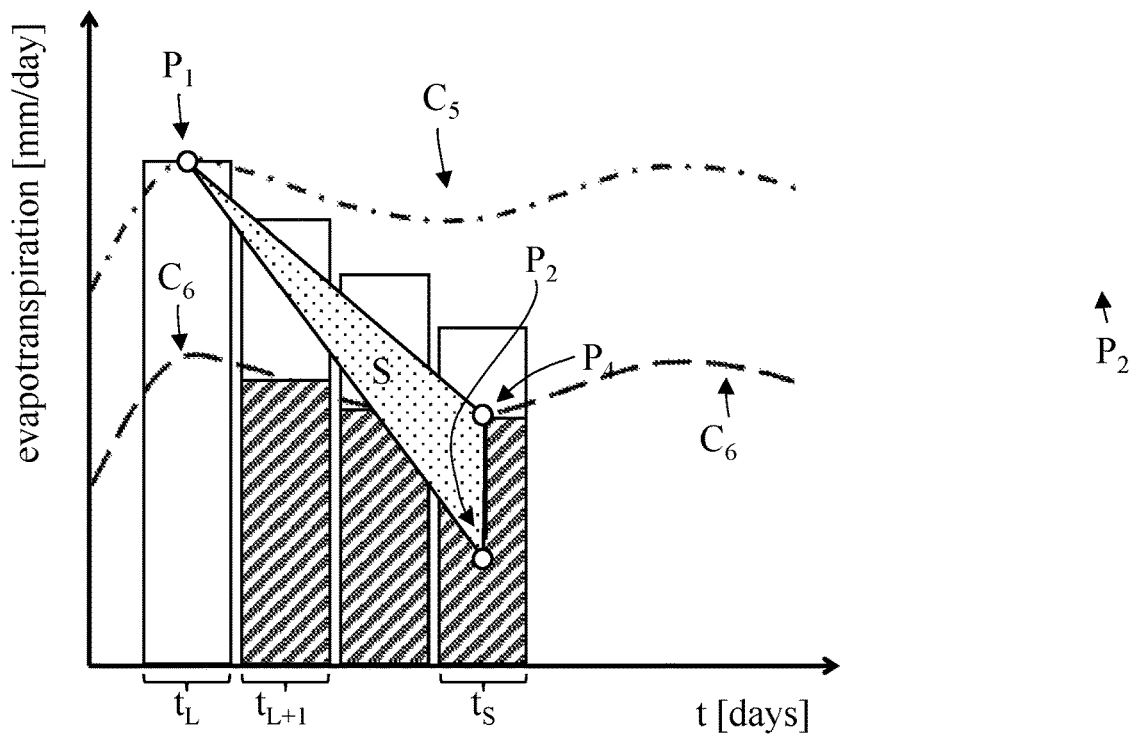
FIG. 4d schematically depicts the computation of a next irrigation time $t_N$ and a compensating forecast irrigation amount corresponding thereto, when ETa($t_S$)<IR($t_S$).

Steps 380-390 in a specific embodiment of method 300 are depicted in FIG. 4d. The compensating forecast irrigation amount is substantially given by a sum of areas: the area below IR(t) between $t_{L+1}$ and $t_S$ (indicated by the diagonally-striped vertical bars) and the area S (defined by the points $P_1$, $P_2$, and $P_4$). According to some embodiments, and as depicted in FIG. 4d, area S is triangular.

Figure 5A:
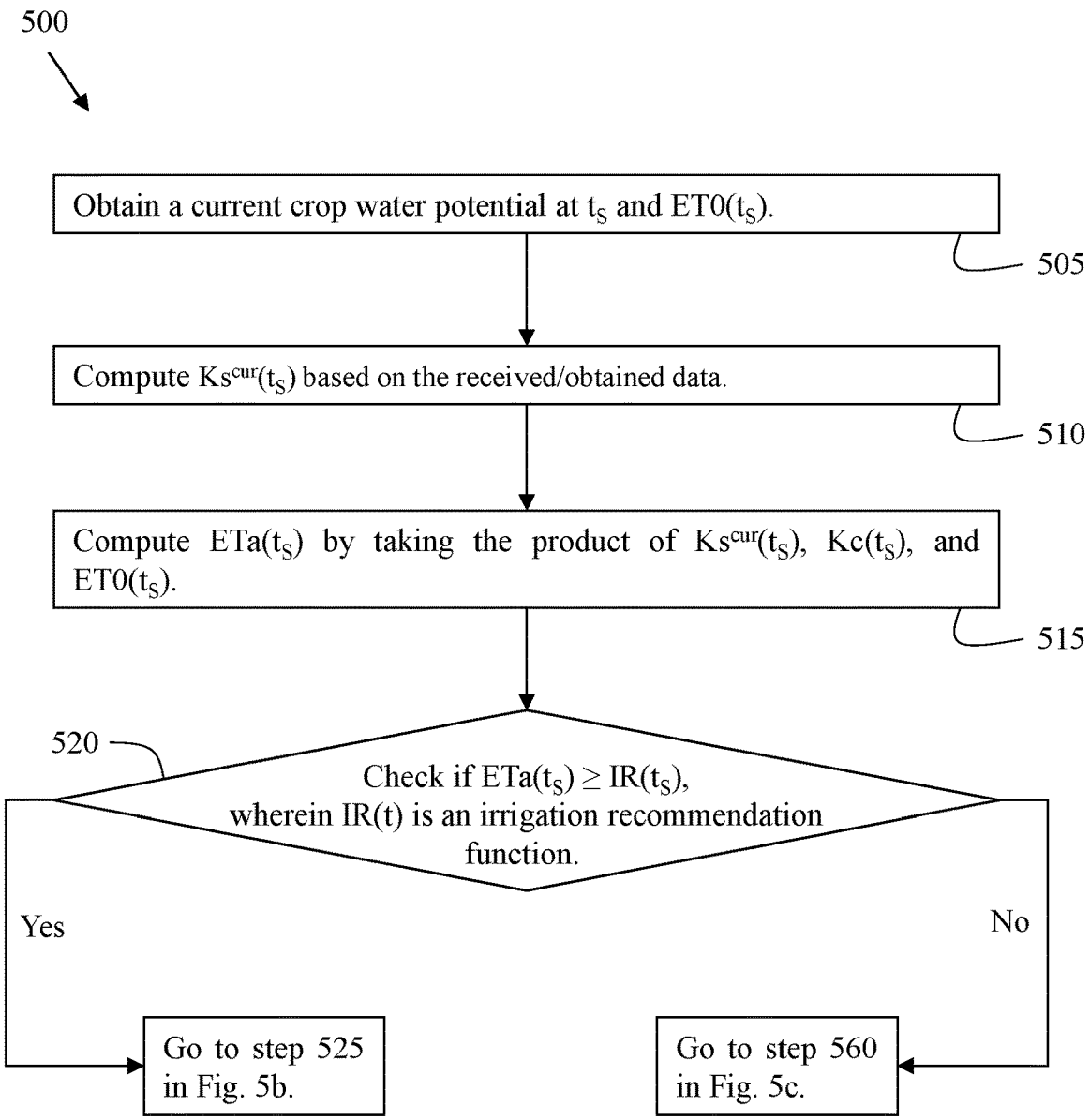
FIGS. 5a-5c present a flowchart of a method for determining forecast irrigation amount(s) corresponding to a next irrigation time, which is set in advance, according to certain embodiments of the present invention.
Figure 5B:
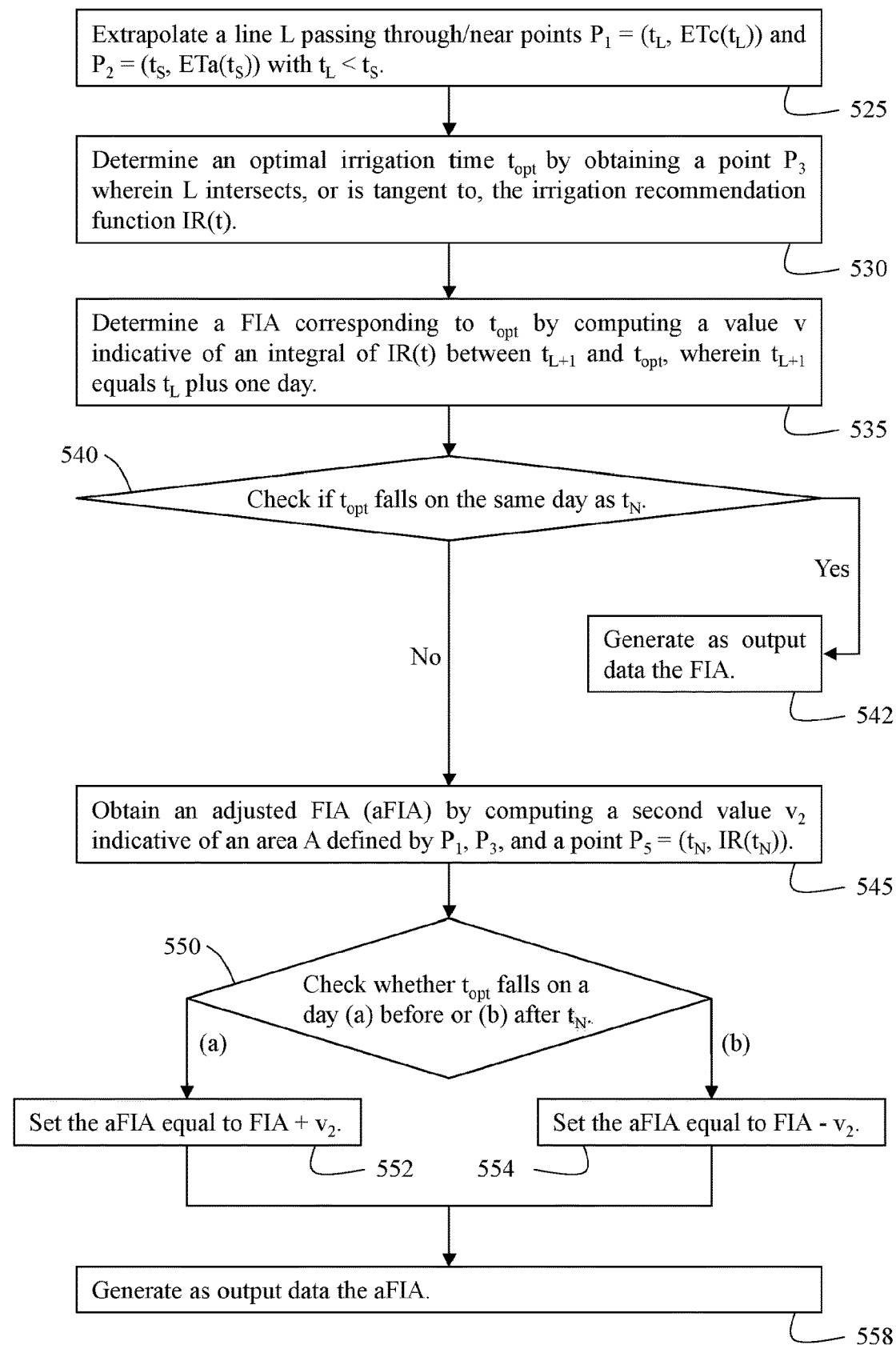
Figure 5C:
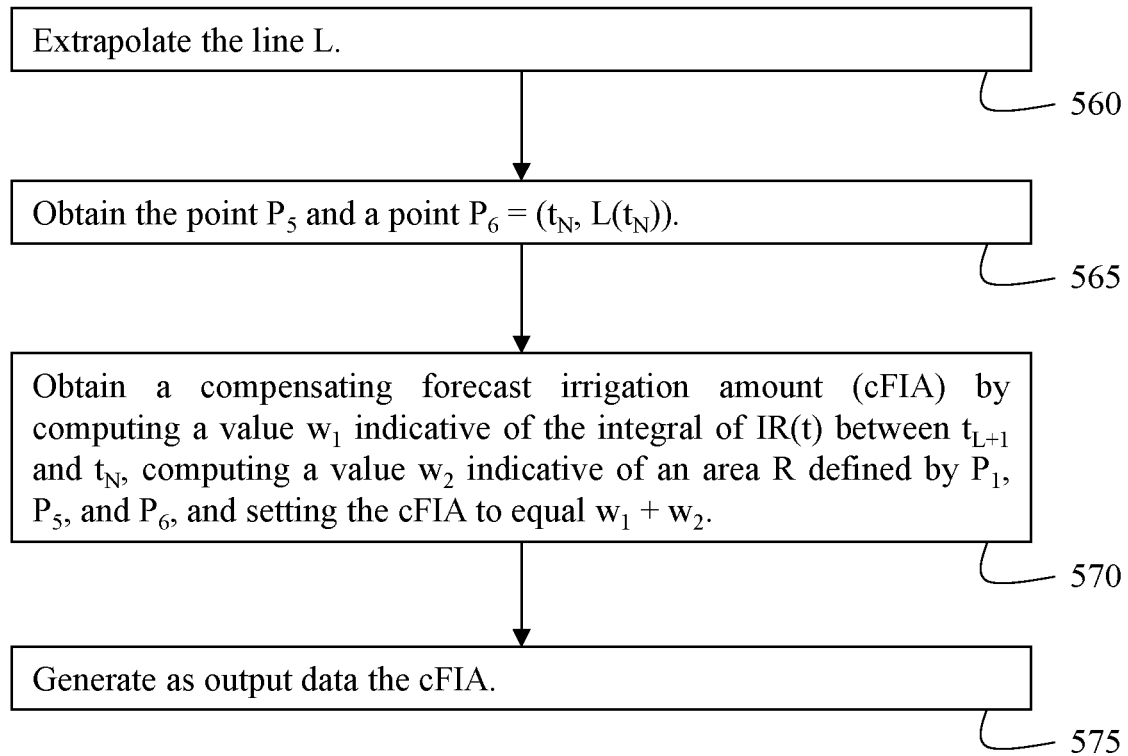

FIGS. 5a-5c depicts a flow chart of an example method 500 to compute a forecast irrigation amount to be applied at $t_N$, wherein $t_N$ is fixed in advance (predetermined), following irrigation/precipitations at $t_L$. For ease of description it is assumed that $t_{opt}$, $t_N$, and $t_L$ each specify a day, i.e. specify a range of time corresponding to the 24 hours within the respective day. In contrast, some other time parameters may be specified to a higher resolution, such as hours or even minutes. Method 500 includes:

A step 505 wherein values of a current crop water potential at $t_S$ and an evapotranspiration at $t_S$ ($ET0(t_S)$) are obtained, essentially as described above in step 310 of method 300.

A step 510 wherein $Ks^{cur}(t)$ is obtained (based on the data received in step 510), as explained above in the subsection Ks computation and demonstrated in FIG. 1.

A step 515 wherein $ETa(t_S)$ is computed by taking the product of $Ks^{cur}(t_S)$, $Kc(t_S)$, and $ET0(t_S)$.

A step 520 wherein it is checked if $ETa(t_S) \geq IR(t_S)$, wherein IR(t) is an irrigation recommendation function.

Contingent on $ETa(t_S)$ being greater than, or equal to, $IR(t_S)$:

A step 525 wherein a line L is extrapolated passing through or near the points $P_1 = (t_L, ETc(t_L))$ and $P_2 = (t_S, ETc(t_S))$ with $t_L < t_S$.

A step 530 wherein the optimal irrigation time $t_{opt}$ is determined by obtaining a point $P_3$ whereat L (first) intersects IR(t), or is (first) tangent to (IR(t), and setting $t_{opt}$ equal to the day of the time coordinate of $P_3$.

A step 535 wherein an FIA corresponding to $t_{opt}$ is determined by computing a value v indicative of an integral of IR(t) between $t_{L+1}$ and $t_{opt}$, wherein $t_{L+1}$ equals $t_L$ plus one day.

A step 540 wherein it is checked whether $t_{opt} = t_N$ (i.e. whether $t_{opt}$ and $t_N$ specify the same day).

Contingent on $t_{opt}$ being equal to $t_N$:

A step 542 wherein the FIA is generated as output data.

Contingent on $t_{opt}$ being different than $t_N$:

A step 545 wherein an adjusted FIA (aFIA) is obtained by computing a second value $v_2$ indicative of an area A defined by the points $P_1$, $P_3$, and a point $P_5$ defined by coordinates $(t_N, IR(t_N))$.

A step 550 wherein it is checked whether (a) $t_{opt} < t_N$, i.e. $t_{opt}$ specifies a day at least one day earlier than the day specified by $t_N$, or (b) $t_{opt} > t_N$, i.e. $t_{opt}$ specifies a day at least one day after the day specified by $t_N$.

A step 552, contingent on (a), wherein the aFIA is set to equal the FIA+$v_2$.

A step 554 contingent on (b), wherein the aFIA is set to equal the FIA−$v_2$.

A step 558 wherein the aFIA is generated as output data.

Contingent on $ETa(t_S)$ being smaller than $IR(t_S)$:

A step 560 wherein the line L is extrapolated.

A step 565 wherein the point $P_5$ is obtained and a point $P_6$ defined by coordinates $(t_N, L(t_N))$.

A step 570 wherein a compensating forecast irrigation amount (cFIA) is obtained by computing a value $w_1$ indicative of an integral of IR(t) between $t_{L+1}$ and $t_N$, computing a value $w_2$ indicative of an area R defined by the points $P_1$, $P_5$, and $P_6$, and taking the sum of $w_1 + w_2$.

A step 575 wherein the cFIA is generated as output data.

Steps 505-520, steps 525-558, and steps 560-575 are outlined in FIG. 5a, FIG. 5b, and FIG. 5c, respectively.

Figure 6A:
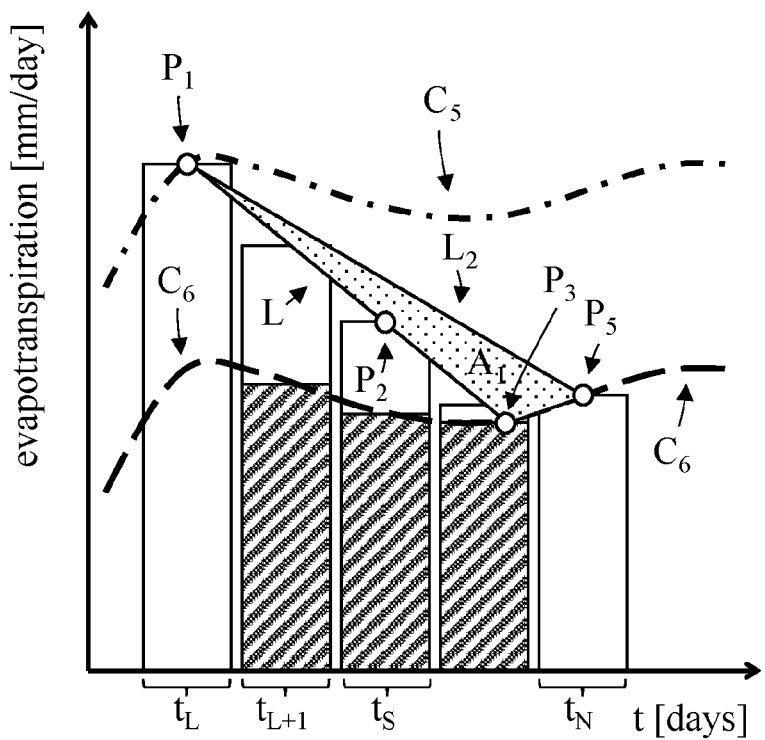
FIGS. 6a-6b schematically depict computations of an adjusted forecast irrigation amount corresponding to a predetermined next irrigation time $t_N$, when ETa($t_S$)≥IR($t_S$).
Figure 6B:
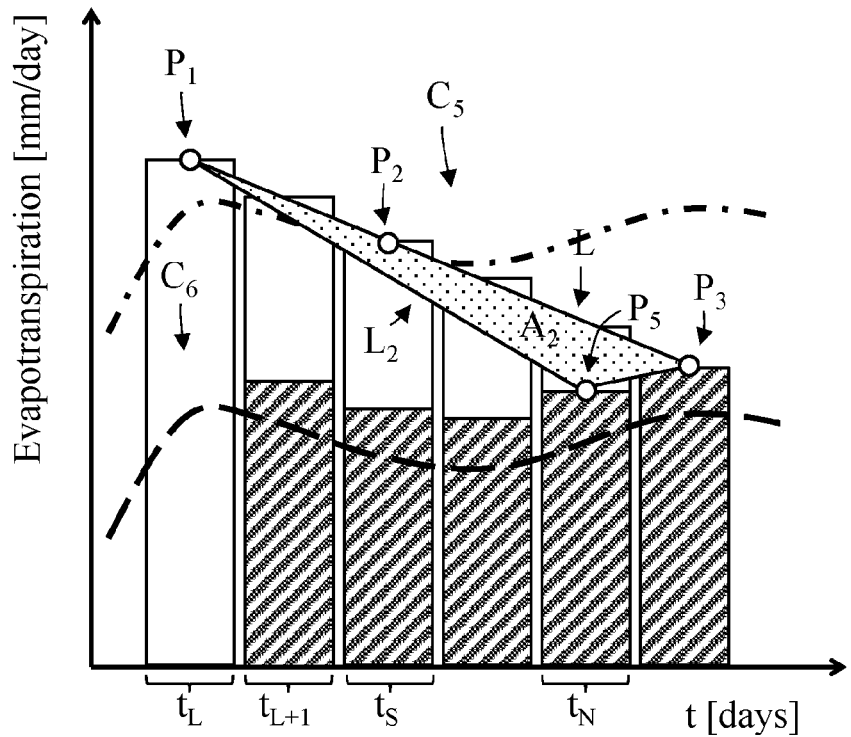

Steps 525 to 545, when $t_{opt} < t_N$, in a specific embodiment of method 500 are depicted in FIG. 6a, and steps 525 to 545, when $t_{opt} > t_N$, are depicted in FIG. 6b. In FIG. 6a line L descends more quickly than a line $L_2$ (which passes through points $P_1$ and $P_5$) with $t_{opt}$ specifying a day before $t_N$, i.e. three days after $t_L$. The adjusted forecast irrigation amount is substantially given by a sum of areas: the area below IR(t) between $t_{L+1}$ and $t_{opt}$ (indicated by the diagonally-striped vertical bars) and the area A (defined by points $P_1$, $P_3$, and $P_5$), indicated by $A_1$ in FIG. 6a. In FIG. 6b line L descends more slowly than $L_2$ with $t_{opt}$ specifying a day after $t_N$, i.e. five days after $t_L$. The adjusted forecast irrigation amount is substantially given by a difference between two areas: the area A (indicated by $A_2$ in FIG. 6b) minus the area below IR(t) between $t_{L+1}$ and $t_{opt}$ (indicated by the diagonally-striped vertical bars).

Figure 6C:
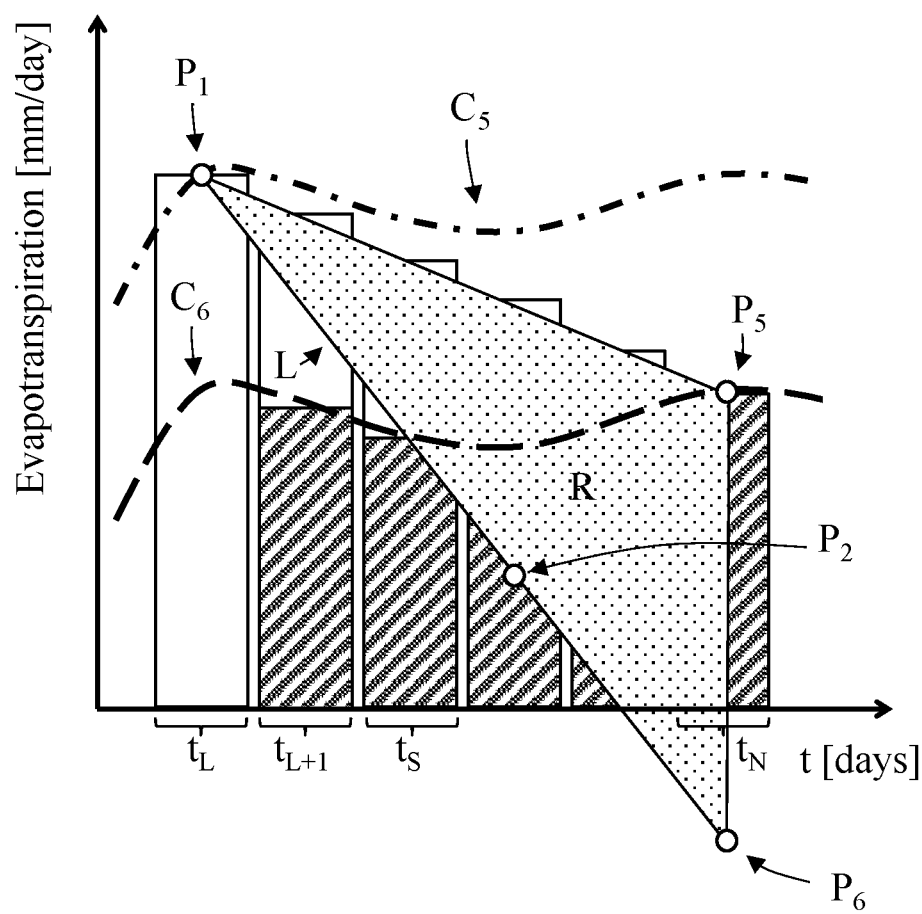
FIG. 6c schematically depicts computation of a compensating forecast irrigation amount corresponding to a predetermined next irrigation time $t_N$, when ETa($t_S$)<IR($t_S$).

Steps 560 to 570 in a specific embodiment of method 500 are depicted in FIG. 6c. The compensating forecast irrigation amount is substantially given by a sum of areas: the area below IR(t) between $t_{L+1}$ and $t_N$ (indicated by the diagonally-striped vertical bars) and the area R (defined by the points $P_1$, $P_5$, and $P_6$).

While in FIG. 6c the y coordinate of $P_6$ is depicted as being smaller than zero, it is evident that dependent on values of the coordinates of $P_1$ and $P_2$, the y coordinate of $P_6$ may also be greater than, or equal to, zero.

It is noted that while in FIGS. 6a-6b the area A is depicted as being triangular, the disclosure also covers the case wherein A is non-triangular, as will be the case when L is not a straight line, for example, when L is obtained from measurement data from two different times, essentially as described above in the description of FIG. 4c. Similarly, the disclosure also covers the case wherein the area R (depicted as triangular in FIG. 6c) is non-triangular.

It is to be understood that when a field contains a number of subplots, methods 300 and 500 may be executed with respect to each of the subplots. Subplot specific irrigation plans may be desirable when the field area is such that the subplots may vary from one another in, for example, geographical parameters. For example, in a mountainous region, subplots may differ in the amount exposure to sunlight or, in flat topography, subplots may differ because of soil. In addition, subplots may vary in the density of crops. Subplot specific irrigation plans can also address the case wherein different crops are planted at different subplots, respectively.

Figure 7:
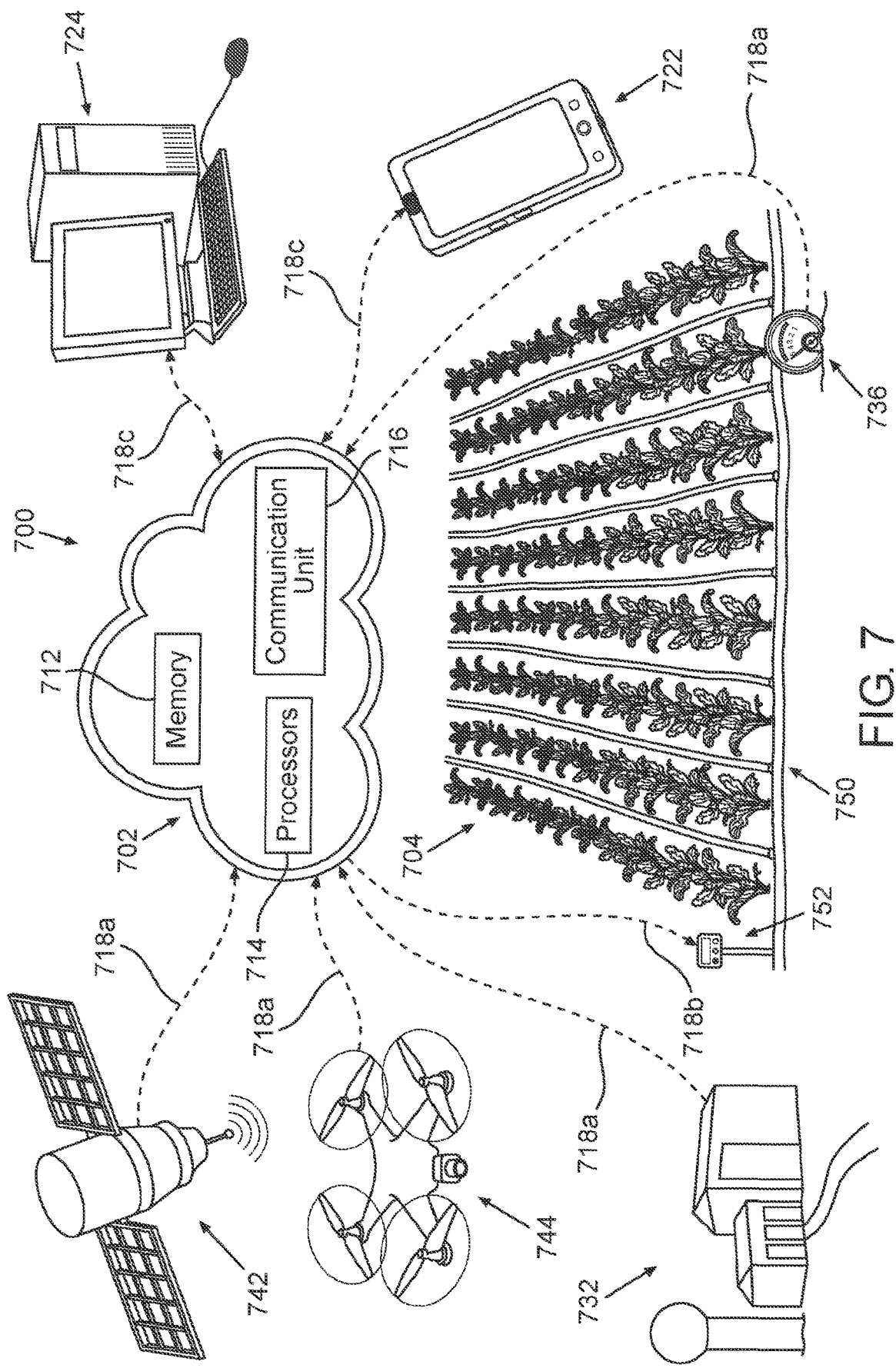
FIG. 7 schematically depicts a system for managing agricultural irrigation of a crop in a field, according to some embodiments of the present invention.

According to another aspect, the present invention provides a system for managing agricultural irrigation of a crop in a field or a part thereof. Generally, the system is configured to manage agricultural irrigation of a plurality of crops in a plurality of fields. FIG. 7 schematically depicts a system 700, including a computing environment 702, according to some embodiments of the present invention. Further depicted is a field 704 (whose irrigation is managed by system 700), input data sources, which send data (e.g. climatology data) to computing environment 702, and output data targets, which receive data (e.g. irrigation plan) from computing environment 702.

Computing environment 702 includes at least one memory 712 (a computer-readable storage medium generally including non-volatile and volatile memory components), one or more computer processors 714 operably coupled to memory 712, and a communication unit 716 configured to send/receive data to/from external targets/sources. Memory 712 may be any suitable data storage device, including volatile memory types such as random access memory, DRAM, SDRAM, and others. Memory 712 may also include non-volatile memory, including read only memory, EEPROM, flash memory, optical and magnetic computer memory storage devices, and others. Memory 712 stores computer-executable instructions for executing one or more of the methods of the present invention, such as method 300 and 500. Computer processors 714 are configured to execute the computer-executable instructions, as further elaborated on below in the description of FIG. 8.

Generally, computing environment 702 will be at least one online server (wherein at least one online server constitutes a "cloud environment") providing services (e.g. irrigation plans) to clients—e.g. smart phones (of users of system 700) with custom software (application), as elaborated on below. The software may be: qualified by one or more smart phone manufacturers; launched automatically once the hardware device, such as an irrigation controller (752, described hereinbelow) is paired with the smart phone; and/or the main console for the user (e.g. a personal computer 724, described hereinbelow). The software application may provide all necessary instructions. The software application may allow a user of system 700 to initiate a data collection sequence by use of a predefined action, e.g. to collect measurement data from in situ sensors (736, described hereinbelow). The software application may gather data entered by the user of system 700, such as whether recommendation supplied by system 700 were or are being implemented, forward such data as user input data (812, described in FIG. 8 hereinbelow) to a data ingest module (822, described in FIG. 8 hereinbelow); allow users of system 700 to be authenticated before accessing the software application; and/or allow communication between the software application and computing environment 702 to be encrypted. A client and server are generally remote from each other and typically interact through a communication network. The relationship of client and server arises by virtue of computer programs running on the respective computing devices and having a client-server relationship to each other. Computing environment 702 is communicatively associated with the input data sources and the output data targets, via communication unit 716 as indicated by arrows 718a that designate data-flow into computing environment 702, arrows 718b that designate data-flow from computing environment 702, and double arrows 718c that designate bi-directional data-flow (i.e. to and from computing environment 702). Generally, communication unit 716 will be communicatively associated with the clients via a communications network, generally the Internet, but additionally/alternatively Wide Area Networks (WANs), Local Area Networks (LANs), analog or digital wired and wireless telephone networks (e.g. a Public Switched Telephone Network (PSTN)), an Integrated Services Digital Network (ISDN), a Digital Subscriber Line (xDSL)), or any other wired or wireless network. The communications network may include multiple networks or sub-networks, each of which may include, for example, a wired or wireless data pathway. According to some embodiments, communication unit 716 is configured for satellite communication.

Input data may be obtained from a user of system 700, via e.g. a user-controlled input data source, such as a smart phone 722, a tablet (not shown), and/or a personal computer 724 of the user, which may have a custom application (app) installed thereon, as further elaborated on below. Additional input data sources include climatology data sources, such as one or more weather services and networks (not shown), one or more local weather stations 732, as further elaborated on below.

The input data sources further include remote sensing data sources, and/or in-situ sensor data sources obtained from one or more sensors 736. According to some embodiments, sensors 736 are communicatively associated with computing environment 702, for example, via Wi-Fi transmitters included in sensors 736. Remote sensing data may be spectral (measuring crop canopy reflectance), thermal (measuring the crop canopy and/or soil temperature), radar (measuring the crop echo), microwave (measuring the soil moisture) and/or data obtained from other systems similar to radar which make use of other parts of the electromagnetic spectrum (such as LiDAR), and may be obtained from one or more satellites 742, one or more drones 744, and one or more (manned or unmanned) airplanes (not shown). Satellites 742 can be, for example, fine temporal resolution low-earth orbit satellites that provide a minimum of three spectral bands and other resource-monitoring satellites, and/or lower temporal frequency earth resources satellites. Examples of in-situ sensors 736 include pressure chambers and soil moisture sensors.

Output data targets include users of system 700, or more precisely, remote devices of the users, such as smart phones, tablets, and/or personal computers, for example, smart phone 722 and personal computer 724. Specifically, computing environment 702 is configured to send irrigation plan to users of system 700, as further elaborated on below. Other possible output data targets include irrigation infrastructures, such as an irrigation infrastructure 750 located in field 704. Irrigation infrastructure 750 includes irrigation elements such as a drip irrigation system, sprinklers, and the like, and an irrigation controller 752 configured to regulate (control) irrigation (e.g. start, stop, increase rate) by the irrigation elements. More specifically, irrigation controller 752 is configured to regulate the irrigation of field 704 according to irrigation instructions received from computing environment 702. According to some embodiments, system 700 includes at least one irrigation controller such as irrigation controller 752.

Figure 8:
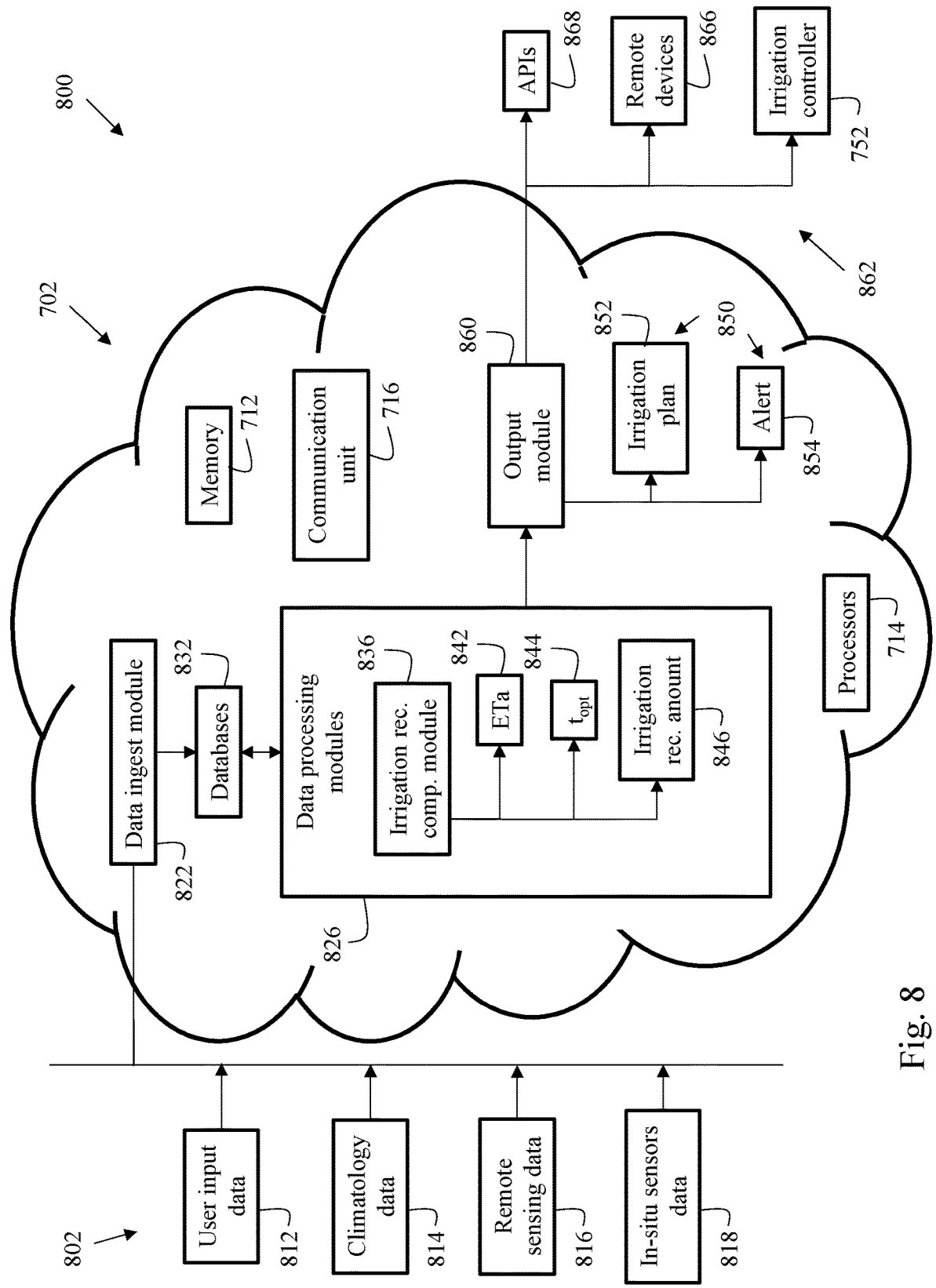
FIG. 8 is a systemic diagram of an analytical framework for managing agricultural irrigation of crops, according to some embodiments of the present invention.

FIG. 8 is a diagram of system components in an analytical framework 800 for managing agricultural irrigation of crops in one or more fields, such as field 704, according to some embodiments of the present invention. Input data 802 is ingested into computing environment 702 from various input data sources. Input data 802 includes user input data 812 (data obtained from the user via e.g. smart phone 722 and/or personal computer 724), climatology data 814, remote-sensing data 816, and in-situ sensors data 818.

User input data 812 will generally include field area boundaries (e.g. field 704 boundaries), crop type and variety, season start (start of the crop growing period), season end (end of the growing season), irrigation method (e.g. drip irrigation or sprinklers) and optionally start and end of the last irrigation/precipitation, and additional field parameters (e.g. soil texture, soil and water salinity, organic matter, irrigation rate).

Climatology data 814 include ET0 and/or $T_{max}$, $T_{min}$, <T> (T average), radiation, relative humidity, precipitation, and wind speed per field managed by system 700. Climatology data 814 may be obtained, for example, from one or more weather services and/or one or more local weather stations (e.g. within 5-10 km of the managed field, such as local weather stations 732, which are located nearby field 704).

Remote sensing data 816 include spectral and/or thermal and/or radar and/or microwave crop and/or soil data from which the water potential of a crop in a field may be obtained. According to some embodiments, remote sensing data 816 are raw ("Level 0") in the form of camera outputs of a drone or an airplane (in particular, without any location information). According to some embodiments, remote sensing data 816 are "Level 1" (including location information), for example, Landsat images obtained from the National Aeronautics Space Administration (NASA). According to some embodiments, remote sensing data 816 are "Level-2" (including location information, and wherein pixel values are given in physical units (such as reflectance or temperature), for example, Sentinel-2 images from the European Space Agency (ESA).

In-situ sensors data 818 includes measurement data from in-situ sensors in managed fields (such as in-situ sensors 736 in field 704), which, according to some embodiments, specifies, or can be used to derive, the water potentials of the crops within each field, respectively.

Input data 802 is ingested by a data ingest module 822. The ingested data is stored (permanently or temporarily) in memory 712 (i.e. in databases 832) and transferred to one or more data processing modules 826. Databases 832 generally include an agricultural database storing data specifying, e.g. Kc tables and vegetation moisture stress reference indices of different crops, and a managed-fields database storing data associated with each of fields managed by system 700, optionally including historical data. The managed-fields database is partitioned into different sections dedicated to each field.

Data processing modules 826 include an irrigation recommendation computing (IRC) module 836. IRC module 836 is configured to obtain an actual evapotranspiration, designated by 842, from input data 802 together with data stored in databases 832 (e.g. Kc tables, crop VMSRIs). For example, following an irrigation of field 704 at $t_L$ and receipt of input data 802 from which the water stress coefficient at $t_S$ ($>t_L$), $Ks^{cur}(t_S)$, is obtained/derived, IRC module 836 computes $ETa(t_S)$, as described above in the description of methods 300 and 500. IRC module 836 is further configured to obtain the optimal irrigation time $t_{opt}$, designated by 844, and a recommended irrigation amount (e.g. the forecast irrigation amount (FIA), the adjusted FIA (aFIA), and the compensating FIA (cFIA)), designated by 846, using ETa 842 and data stored in databases 832, as described hereinabove in the description of FIGS. 3 and 5. More specifically, IRC module 836 is configured to perform the computational steps starting at step 340 in method 300, and/or the computational steps starting at step 520 in method 500.

Output data 850, e.g. an irrigation plan 852 and/or alert 854 (alerting a user that irrigation of a respective field is late, as determined in step 340 in method 300 and in step 520 in method 500), generated by data processing modules 826, are conveyed therefrom to an output module 860, and generally also to databases 832 for future use and reference. In particular, output data 850, as well as other data generated by IRC module 836 with respect to a field 704 stored in a corresponding section of databases 832. Output module 860 sends output data 850 to output data targets 862, such as one or more remote devices 866 (e.g. smart phone 722, personal computer 724), irrigation controller 752, and application programming interfaces (APIs) 868.

Figure 9:
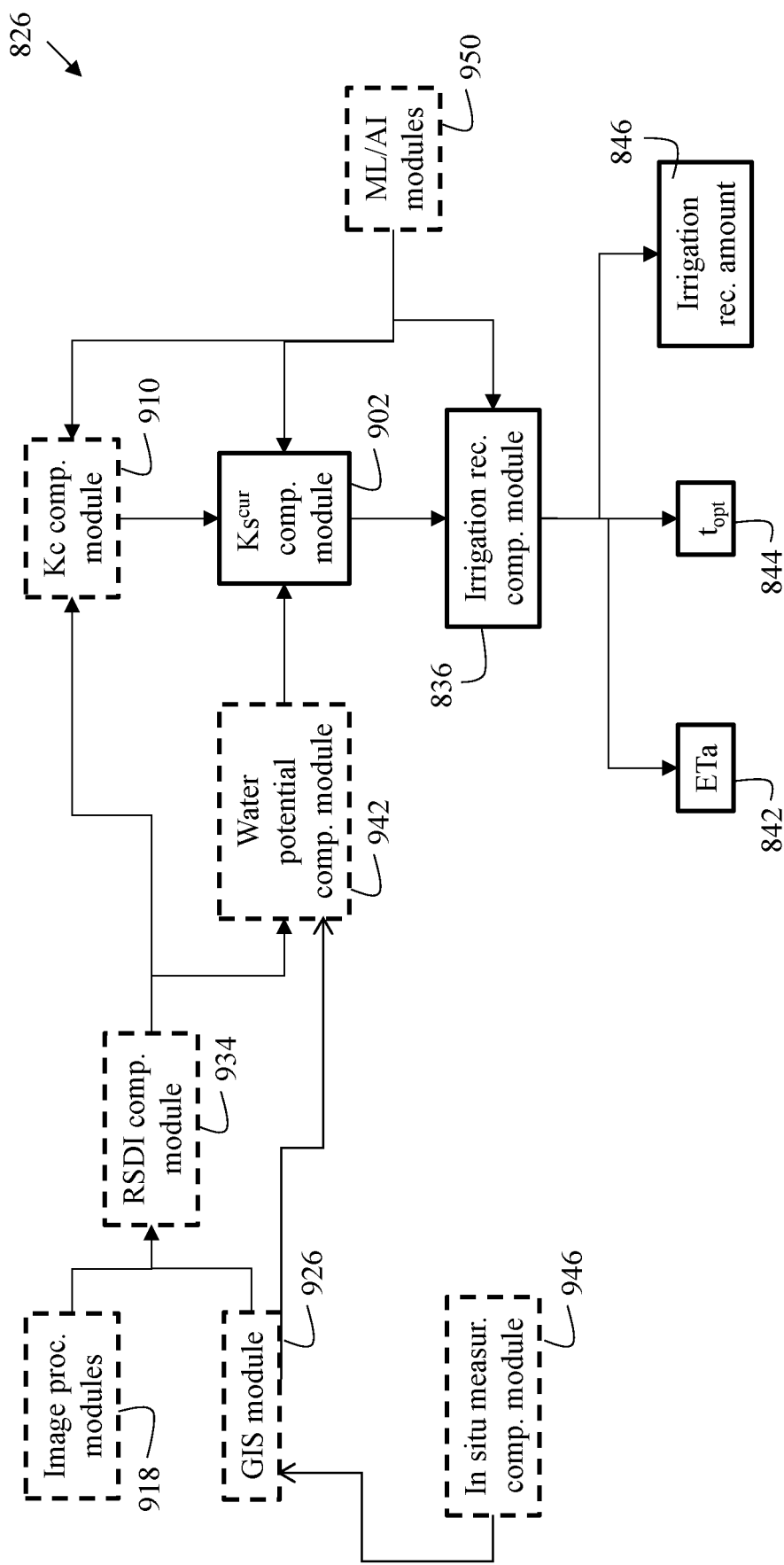
FIG. 9 is a diagram of data processing modules of the analytical framework of FIG. 8, according to some embodiments of the present invention.

FIG. 9 depicts a specific embodiment of data processing modules 826. Optional modules are indicated by dashed boxes. In addition to IRC module 836, data processing modules 826 further include a $Ks^{cur}$ computing module 902. Data processing modules 826 may further include a Kc computing module 910, one or more image-processing modules 918, a geographical information system (GIS) module 926, a remote sensing derived index(es) (RSDI) computing module 934, a crop water potential (CWP) computing module 942, in situ measurements computing module 946, and one or more machine learning (ML) and/or artificial intelligence (AI) modules: ML/AI modules 950.

Image-processing modules 918 are configured to analyze remote-sensing imagery data. According to some embodiments, image-processing modules 918 are used in converting Level-0 or Level-1 imagery data into Level-2 imagery data.

GIS module 926 may be configured to match (and/or confine) the images to the field boundaries, remove cloud effects and atmospheric effects and to calculate an individual recommendation for each subplot. According to some embodiments, GIS module 926 removes pixels at the extreme ends of a scale (e.g. an intensity scale) or pixels having at least one component at an extreme end of a scale.

RSDI computing module 934 is configured to receive data from image-processing modules 918, and optionally GIS module 926 and convert the received data into one or more water stress indices such as the normalized difference water index (NDWI) or the crop water stress index (CWSI), and vegetation indices such as NDVI and EVI or combination of the above with radar and/or thermal information.

CWP computing module 942 is configured to receive data from RSDI computing module 934 and to convert the received data into the water potential of the crop. According to some embodiments, CWP module 942 is additionally configured to receive, and take into account in computing the water potential, data from in-situ sensors 736. According to some embodiments, not depicted in FIG. 9, CWP computing module 942 receives data only from in-situ sensors 736.

According to some embodiments that include Kc computing module 910, Kc computing module 910 is configured to obtain the value of the crop coefficient Kc based on vegetation index data obtained from RSDI computing module 934 or other irrigation protocols (such as the FAO-56), and optionally, climatology data 814, e.g. wind speed and relative humidity.

$Ks^{cur}$ computing module 902 is configured to compute a current water stress coefficient $Ks^{cur}$ (e.g. at $t_S$) based on the current crop water potential (which is received from CWP module 942), and vegetation moisture stress reference indices (VMSRIs) stored in databases 832 as schematically demonstrated in FIG. 1.

In situ measurements computing module 946 is configured to receive data from in situ-sensors 736 and to process the data from the different sensors, e.g. to geo-statistically average readings from the different sensors to obtain measurement values representative of the irrigation block. According to some embodiments, in-situ measurements computing module 946 outputs are assigned location information by GIS module 926. According to some embodiments, in-situ measurements computing module 946 outputs are used by CWP module 942 to compute water potentials of plants located in different irrigation blocks.

ML/AI modules 950 are configured to improve computing environment 702 irrigation plans by analyzing, for example, past recommendations during a past growing season (or a part thereof) and measurement data of the crops during the past growing season, as well as optionally climatology data during the growing season and the crop yield at the end of the season, and/or the like. For example, according to some embodiments, ML/AI modules 950 are configured to adjust the fitting procedure deriving line L in step 350 of method 300 (or step 525 of method 500), thereby potentially modifying the obtained value of the optimal irrigation time in step 360 (or step 530) and the determined FIA in step 370 (or step 535). Similarly, according to some embodiments, ML/AI modules 950 are configured to adjust the shapes and sizes of area S in step 390 of method 300, and areas A and R in steps 545 and 570 of method 500, respectively. According to some embodiments, wherein Kc is obtained/computed using also remote sensing imagery data, ML/AI modules 950 are configured to improve the determination of Kc based on historical data (reference Kc tables) and (past) measurement data and also optionally measurement data of the field (and the crop) from preceding seasons.

The methods of the present invention, such as methods 300 and 500, may be implemented by many different computing environments. For example, computing environment 702 may include a special purpose computer, a programmed microprocessor or microcontroller, and peripheral integrated circuit element(s), an ASIC or other integrated circuit, a digital signal processor, an image processor (e.g. to covert Level-0 or Level-1 imagery data to Level-2 imagery data), electronic or logic circuitry such as discrete element circuit, a programmable logic device or gate array such as a PLD, PLA, FPGA, PAL, and any comparable means.

The term "microprocessor", or "microcontroller" as used herein, refers broadly without limitation, to a computer system, a computer equivalent, or a processor which is designed to perform arithmetic and/or logic operations using logic circuitry that responds to and processes the basic instructions that drive a computer. Thus, the term "microprocessor" refers to any device comprising a programmable digital electronic component that incorporates the functions of a central processing unit (CPU) on a single semiconducting integrated circuit (IC). Typical computer systems may comprise one or more microprocessors. Therefore, the term "microprocessor" as used herein, typically refers to a device comprising at least one microprocessor.

In general, any means of implementing the methods disclosed herein, such as methods 300 and 500, can be used to implement the various aspects of the present invention. Exemplary hardware that can be used for the present invention includes computers (e.g. a cloud-based computing environment, according to some embodiments of computing environment 702), handheld devices (e.g. a tablet of a user of system 700), telephones (e.g., cellular, Internet enabled, digital, analog, hybrids, and others), such as smart phone 722, and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, non-transitory or otherwise, executed on programmed general-purpose computer with the cooperation of a controller and memory, a special purpose computer, a microprocessor, or the like. In these instances, the systems and methods of this invention can be implemented as a program embedded on personal computer such as an applet, JAVA or CGI script, as a resource residing on a server or computer workstation, as a routine embedded in a dedicated measurement system, system component, or the like. The system can also be implemented by physically incorporating the system and/or method into a software and/or hardware system.

Additionally, the data processing operations disclosed herein may be performed by one or more program instructions stored in or executed by such memory, and further may be performed by one or more modules (e.g. data processing modules 826) configured to carry out those program instructions. "Modules" refer to any known or later developed hardware, software, firmware, artificial intelligence, fuzzy logic, expert system or combination of hardware and software that is capable of receiving, sending, storing, and/or processing data according to the described functionality thereof.

As used herein, according to some embodiments, "remote sensing apparatus" refers to a satellite, a drone, and/or an airplane having means configured for remote sensing.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A method for managing agricultural irrigation of a crop in an area of a field or a subplot thereof during a growing period, the method comprising:
   receiving data indicative of an irrigation recommendation function of the crop during a growing period (IR(t)), data indicative of a current crop water potential at a time $t_S$ within the growing period, data indicative of an evapotranspiration (ET0) at $t_S$, data indicative of a last irrigation time and data indicative of a crop coefficient Kc;
   computing a current water stress coefficient $Ks^{cur}(t_S)$;
   computing an actual evapotranspiration (ETa) at $t_S$ (ETa($t_S$)) of said crop by taking a product of $Ks^{cur}(t_S)$ and a corresponding non-stress crop evapotranspiration (ETc) at $t_S$ (ETc($t_S$)), wherein ETc($t_S$)=ET0($t_S$) *Kc($t_S$); and
   if ETa($t_S$)≥IR($t_S$),
      setting an optimal irrigation time ($t_{opt}$) by:
         extrapolating a line L passing through or near a first point $P_1$ and a second point $P_2$, $P_1$ defined by first coordinates ($t_L$, ETc($t_L$)) comprising a last irrigation time $t_L$, which is earlier than $t_S$, and ETc at $t_L$, and $P_2$ defined by second coordinates ($t_S$, ETa($t_S$));
         obtaining a third point $P_3$, whereat line L intersects, or is tangent to, a curve defined by IR(t), wherein $t_{opt}$ is equal to the day of the time coordinate of $P_3$; and
      setting a forecast irrigation amount (FIA) by:
         computing a value v indicative of an integral of IR(t), between $t_{L+1}$ and $t_{opt}$,
         wherein $t_{L+1}$ equals $t_L$ plus one day,
         wherein the FIA is equal to v.

2. The method of claim 1, wherein said method is carried out within a computing environment comprising at least one computer processor and at least one computer-readable non-transitory storage medium operably coupled to the computer processor and having program instructions stored therein and data specifying a crop type, a boundary of the field area, a start of the growing period, and optionally values of a crop coefficient Kc for the growing period, the computer processor being operable to execute the program instructions to generate an irrigation plan comprising the optimal irrigation time ($t_{opt}$) for a next irrigation and the forecast irrigation amount (FIA) at $t_{opt}$; and/or
   further comprising generating, as output data, the optimal irrigation time ($t_{opt}$) and the forecast irrigation amount (FIA).

3. The method of claim 1, wherein the method further comprises, if ETa($t_S$)<IR($t_S$):
   setting $t_{opt}$ equal to $t_S$;
   setting a compensating forecast irrigation amount (cFIA) by:
      computing a value $u_1$ indicative of an integral of IR(t) between $t_{L+1}$ and $t_S$;
      computing a value $u_2$ indicative of an area S defined by the points $P_1$ and $P_2$ and a fourth point $P_4$=($t_S$, IR($t_S$)), wherein the cFIA is equal to $u_1+u_2$; and
      generating, as output data, $t_{opt}$ and the cFIA; and/or
      further comprising setting a next irrigation time $t_N$ equal to $t_{opt}$.

4. The method of claim 1, wherein a next irrigation time $t_N$ is predetermined, the method further comprising for ETa($t_S$)≥IR($t_S$):
   if $t_N=t_{opt}$, generating, as output data, the forecast irrigation amount (FIA); and if $t_N \neq t_{opt}$, obtaining an adjusted FIA (aFIA) by:
      computing a second value $v_2$ indicative of an area A defined by the points $P_1$, $P_3$, and a point $P_5$=($t_N$, IR($t_N$));
   if $t_N<t_{opt}$:
      setting the aFIA to equal FIA+$v_2$; and
   if $t_N>t_{opt}$:
      setting the aFIA to equal FIA−$v_2$; and
   generating, as output data, the aFIA.

5. The method of claim 4, further comprising for ETa($t_S$)<IR($t_S$):
   extrapolating the line L;
   obtaining the point $P_5$ and a point $P_6$ defined by coordinates ($t_N$, L($t_N$)); and
   setting a compensating forecast irrigation amount (cFIA) by:
      computing a value $w_1$ indicative of an integral of IR(t) between $t_{L+1}$ and $t_N$;
      computing a value $w_2$ indicative of an area R defined by the points $P_1$, $P_5$, and $P_6$, wherein the cFIA is equal to $w_1+w_2$; and
      generating, as output data, the cFIA.

6. The method of claim 1, further comprising outputting an alert when ETa($t_S$)<IR($t_S$); and/or
   obtaining $Ks^{cur}(t_S)$ by computing a value indicative of a ratio of a first difference to a second difference; wherein the first difference is defined as a difference between a non-stress water potential taken at $t_S$ from a non-stress reference index of the crop, and the current crop water potential at $t_S$; and wherein the second difference is defined as a difference between the non-stress water potential and a maximum stress water potential taken at $t_S$ from a maximum stress reference index of said crop.

7. The method of claim 1, wherein the field area comprises a plurality of subplots, said method comprises generating a set of irrigation plans, each plan comprising a subplot specific optimal irrigation time and a corresponding forecast irrigation amount; wherein $Ks^{cur}(t_S)$, ETa($t_S$), $t_{opt}$, the FIA are permanently stored in the at least one non-transitory computer-readable storage medium, in a section thereof dedicated to the field; wherein the current water potential is obtained using remote sensing data and/or in-situ measurement data; and/or wherein remote sensing data are thermal data or microwave data of the field soil.

8. The method of claim 7, wherein the remote sensing data comprises images from one or more satellites, one or more drones, one or more airplanes, or a combination thereof; and/or wherein the remote sensing data are spectral reflectance data, thermal data, radar data of the crop canopy, or a combination thereof.

9. The method of claim 8, wherein each pixel or a plurality of pixels in each of the images contains data corresponding to a respective area within the field or the subplot; and/or further comprising obtaining one or more remote sensing derived indices using the spectral reflectance data, thermal data, and/or radar data of the crop canopy.

10. The method of claim 9, wherein the one or more remote sensing derived indices comprise at least one of the normalized difference water index (NDWI), derived from spectral reflectance data in the visible, near infrared (NIR) and short wave infrared (SWIR) spectral bands, and the crop water stress index (CWSI), derived from crop and air temperature measurement data; or the remote sensing data are spectral reflectance data in the red and infrared spectral bands, and optionally in the blue spectral band, allowing to obtain at least one of the normalized difference vegetation index (NDVI) and enhanced vegetation index (EVI) therefrom.

11. The method of claim 1, wherein the Kc values are adjusted based on remote sensing data obtained during the growing period and/or wherein the line L is straight.

12. The method of claim 1, further comprising, after obtaining $t_{opt}$:
computing a current water stress coefficient $Ks^{cur}(t'_S)$, wherein $t_S < t'_S < t_{opt}$;
computing an actual evapotranspiration (ETa) at $t'_S$ (ETa $(t'_S)$); and
if $ETa(t'_S) \geq IR(t'_S)$:
  adjusting $t_{opt}$ by:
    extrapolating a line L' passing through or near first point $P_1$, second point $P_2$, and point $P'_2$ defined by second coordinates $(t'_S, ETa(t'_S))$;
      obtaining a point $P'_3$, whereat line L' intersects, or is tangent to, the curve defined by IR(t); and
    setting $t_{opt}$ to equal the day of the time coordinate of $P'_3$; and
  adjusting the FIA by:
    computing a value v' indicative of an integral of IR(t), between $t_{L+1}$ and $t_N$; and
    setting the FIA to equal v'; and/or
wherein the line L is selected from a family of lines including curved lines.

13. The method of claim 2, wherein the output data are sent to an irrigation controller located near or within the field; and/or wherein the output data are sent to a remote device of a user, the user being in charge of the irrigation of the field.

14. A system for managing agricultural irrigation of a crop in an area of a field or a part thereof, the system comprising:
a computing environment, the computing environment comprising:
  at least one non-transitory computer-readable storage medium having computer-executable instructions stored therein and data specifying a crop type, a boundary of the field area, a start and an end of the growing period, and values of a crop coefficient Kc for the growing period; and
  at least one computer processor operably coupled to the at least one computer-readable non-transitory storage medium and configured by the computer-executable instructions;
wherein the computing environment is able to:
  receive data indicative of a current crop water potential at a time $t_S$ within the growing period, data indicative of an evapotranspiration (ET0) at $t_S$, and data indicative of a last irrigation time;
  compute a current water stress coefficient $Ks^{cur}(t_S)$;
  compute an actual evapotranspiration (ETa) at $t_S$ (ETa $(t_S)$) of said crop by taking a product of $Ks^{cur}(t_S)$ and a corresponding non-stress crop evapotranspiration (ETc) at $t_S$ (ETc$(t_S)$), wherein $ETc(t_S)=ET0(t_S)*Kc(t_S)$;
    check whether $ETa(t_S) \geq IR(t_S)$, wherein IR(t) is an irrigation recommendation function of the crop; and
  if $ETa(t_S) \geq IR(t_S)$:
    obtain $t_{opt}$ by:
      extrapolating a line L passing through or near a first point $P_1$ and a second point $P_2$, $P_1$ defined by first coordinates $(t_L, ETc(t_L))$ comprising a last irrigation time which is earlier than $t_S$, and ETc at $t_L$, and $P_2$ defined by second coordinates $(t_S, ETa(t_S))$;
      obtaining a third point $P_3$, whereat line L intersects, or is tangent to, a curve defined by IR(t); and
      setting $t_{opt}$ to equal the day of the time coordinate of $P_3$; and
    obtain a FIA by:
      computing a value v indicative of an integral of IR(t), between $t_{L+1}$ and $t_{opt}$, wherein $t_{L+1}$ equals $t_L$ plus one day; and
      setting the FIA to equal v.

15. The system of claim 14, wherein the computing environment is further configured to generate, as output data, $t_{opt}$ and the FIA;
wherein for $ETa(t_S) < IR(t_S)$ the computing environment is further configured to:
  set $t_{opt}$ equal to $t_S$;
  obtain a compensating forecast irrigation amount (cFIA) by:
    computing a value $u_1$ indicative of an integral of IR(t) between $t_{L+1}$ and $t_S$;
    computing a value $u_2$ indicative of an area S defined by the points $P_1$ and $P_2$ and a fourth point $P4=(t_S, IR(t_S))$; and
    setting the cFIA to equal $u_1+u_2$; and
  generate, as output data, $t_{opt}$ and the cFIA; and/or
wherein the computing environment is further configured to set a next irrigation time $t_N$ equal to $t_{opt}$.

16. The system of claim 14, wherein a next irrigation time $t_N$ is predetermined and wherein for $ETa(t_S) \geq IR(t_S)$ the computing environment is further configured to:
if $t_N=t_{opt}$, generate, as output data, the forecast irrigation amount (FIA); and
if $t_N \neq t_{opt}$, obtain an adjusted FIA (aFIA) by:
  computing a second value $v_2$ indicative of an area A defined by the points $P_1$, $P_3$, and a point $P_5=(t_N, IR(t_N))$;
  if $t_N < t_{opt}$:
    setting the aFIA to equal $FIA+v_2$; and
  if $t_N > t_{opt}$:
    setting the aFIA to equal $FIA-v_2$; and
generate, as output data, the aFIA; wherein for $ETa(t_S) < IR(t_S)$, the system is further configured to:
extrapolate the line L;
obtain the point $P_5$ and a point $P_6$ defined by coordinates $(t_N, L(t_N))$; and
obtain a compensating forecast irrigation amount (cFIA) by:
  computing a value $w_1$ indicative of an integral of IR(t) between $t_{L+1}$ and $t_N$;
  computing a value $w_2$ indicative of an area R defined by the points $P_1$, $P_5$, and $P_6$; and
  setting the cFIA to equal $w_1+w_2$; and
generate, as output data, the cFIA.

17. The system of claim 14, wherein for $ETa(t_S) < IR(t_S)$ the computing environment is further configured to output an alert; wherein the computing environment is further configured to obtain $Ks^{cur}(t_S)$ by computing a value indicative of a ratio of a first difference to a second difference;
wherein the first difference is defined as a difference between a non-stress water potential taken at $t_S$ from a non-stress reference index of the crop, and the current crop water potential at $t_S$; and
wherein the second difference is defined as a difference between the non-stress water potential, and a maximum stress water potential taken at $t_S$ from a maximum stress reference index of said crop.

18. The system of claim 14, wherein the field comprises a plurality of subplots, said computing environment being configured to generate a set of irrigation plans, each plan comprising a subplot specific optimal irrigation time and a corresponding forecast irrigation amount; wherein the computing environment is further configured to have $Ks^{cur}(t_S)$, $ETa(t_S)$, $t_{opt}$, and the FIA permanently stored in the at least one computer-readable non-transitory storage medium, in a section thereof dedicated to the field; and/or wherein the computing environment is communicatively associated with at least one remote sensing apparatus and/or at least one in situ sensor, the current water potential being obtained using remote sensing data from the at least one remote sensing apparatus and/or in-situ measurement data from the at least one in situ sensor.

19. The system of claim 18, wherein the remote sensing data comprise images from one or more satellites, one or more drones, and/or one or more airplanes; wherein each pixel or a plurality of pixels in each of the images contains data corresponding to a respective area within the field or the subplot; wherein the remote sensing data are spectral reflectance data, thermal data, and/or radar data of the crop canopy; and/or wherein remote sensing data are thermal data or microwave data of the field soil.

20. The system of claim 19, wherein the computing environment is further configured to obtain one or more remote sensing derived indices using the spectral reflectance data, thermal data, and/or radar data of the crop canopy; and optionally, wherein the one or more remote sensing derived indices comprise at least one of the normalized difference water index (NDWI), derived from spectral reflectance data in the near infrared (NIR) and short wave infrared (SWIR) spectral bands, and the crop water stress index (CWSI), derived from crop and air temperature measurement data; or wherein the remote sensing data are spectral reflectance data in the red and infrared spectral bands, and optionally in the blue spectral band, allowing to obtain at least one of the normalized difference vegetation index (NDVI) and enhanced vegetation index (EVI) therefrom.

21. The system of claim 14, wherein the computing environment is further configured to adjust the Kc values based on remote sensing data obtained during the growing period; and/or wherein the line L is straight.

22. The system of claim 14, wherein the computing environment is further configured to, subsequently to obtaining $t_{opt}$:

compute a current water stress coefficient $Ks^{cur}(t'_S)$, wherein $t_S < t'_S < t_{opt}$;

compute an actual evapotranspiration (ETa) at $t'_S$ (ETa $(t'_S)$); and if $ETa(t'_S) \geq IR(t'_S)$:

adjust $t_{opt}$ by:

extrapolating a line L' passing through or near first point $P_1$, second point $P_2$, and point $P'_2$ defined by second coordinates $(t'_S, ETa(t'_S))$;

obtaining a point $P'_3$, whereat line L' intersects, or is tangent to, the curve defined by IR(t); and setting $t_{opt}$ to equal the day of the time coordinate of P; and adjust the FIA by:

compute a value v' indicative of an integral of IR(t), between $t_{L+1}$ and $t_N$; and set the FIA to equal v'.

23. The system of claim 14, further comprising an irrigation controller, located near or within the field, the irrigation controller being configured to receive the output data generated by the computing environment, wherein the irrigation controller is configured to regulate irrigation by an irrigation infrastructure in the field according to the output data received from the computing environment; and/or wherein the line L is selected from a family of lines including curved lines.

* * * * *